(12) United States Patent
Matsuzaki et al.

(10) Patent No.: US 8,077,980 B2
(45) Date of Patent: Dec. 13, 2011

(54) IMAGE PROCESSING APPARATUS

(75) Inventors: Natsume Matsuzaki, Osaka (JP); Kaoru Yokota, Hyogo (JP); Masao Nonaka, Osaka (JP); Mitsuhiro Inoue, Osaka (JP); Tohru Nakahara, Osaka (JP); Akio Higashi, Osaka (JP)

(73) Assignee: Panasonic Corporation, Osaka (JP)

( * ) Notice: Subject to any disclaimer, the term of this patent is extended or adjusted under 35 U.S.C. 154(b) by 1135 days.

(21) Appl. No.: 11/579,869

(22) PCT Filed: May 16, 2005

(86) PCT No.: PCT/JP2005/008866
§ 371 (c)(1),
(2), (4) Date: Jul. 2, 2007

(87) PCT Pub. No.: WO2005/112438
PCT Pub. Date: Nov. 24, 2005

(65) Prior Publication Data
US 2007/0286496 A1 Dec. 13, 2007

(30) Foreign Application Priority Data

May 18, 2004 (JP) .................................. 2004-147396

(51) Int. Cl.
*G06K 9/62* (2006.01)
(52) U.S. Cl. ......... 382/209; 382/260; 382/261; 382/305
(58) Field of Classification Search ................... 382/209, 382/260, 261, 305
See application file for complete search history.

(56) References Cited

U.S. PATENT DOCUMENTS

| 6,456,729 | B1 * | 9/2002 | Moore ........................ 382/103 |
| 6,628,824 | B1 * | 9/2003 | Belanger ...................... 382/165 |
| 6,765,608 | B1 * | 7/2004 | Himeda et al. ............. 348/211.5 |
| 6,853,750 | B2 | 2/2005 | Aoki |
| 6,993,188 | B2 | 1/2006 | Aoki |
| 7,076,101 | B2 * | 7/2006 | Chung et al. .................. 382/218 |
| 7,330,593 | B2 * | 2/2008 | Hong et al. .................... 382/209 |

FOREIGN PATENT DOCUMENTS

| JP | 2000-278584 | 10/2000 |
| JP | 2001-320702 | 11/2001 |
| JP | 2002-182275 | 6/2002 |
| JP | 2003-32616 | 1/2003 |
| JP | 2003-204427 | 7/2003 |
| JP | 2005-110004 | 4/2005 |

* cited by examiner

*Primary Examiner* — Stephen Koziol
(74) *Attorney, Agent, or Firm* — Wenderoth, Lind & Ponack, L.L.P.

(57) ABSTRACT

An image processing apparatus enables image data to be handled easily after photography. A server apparatus patterns images and controls information in correspondence with user identifiers. A digital camera photographs a subject, obtains a pattern image and a piece of control information from the server apparatus, and judges whether a portion of the image data obtained by photography matches the obtained pattern image. If a matching portion exists, then the digital camera operates in accordance with an operation instruction included in the piece of control information. If the operation instruction is mosaic processing, then the digital camera performs mosaic processing to the matching portion. If the operation instruction is image replacement, then the digital camera replaces the matching portion with a predetermined image or performs CG processing on the matching portion. If the operation instruction is frame deletion, then the digital camera deletes the image data.

1 Claim, 19 Drawing Sheets

FIG. 3

USER INFORMATION TABLE ~121

| USER IDENTIFIER | USER INFORMATION | | | | |
|---|---|---|---|---|---|
| | TAG IDENTIFIER | PATTERN IMAGE IDENTIFIER | CONTROL INFORMATION IDENTIFIER | ATTACHED INFORMATION IDENTIFIER |
| U001 | — | F0001 | P001 | — |
| U001 | T002 | F0002 | P001 | — |
| U002 | T003 | F0003 | P002 | X001 |
| U003 | — | F0004 | P003 | — |
| U003 | — | F0005, F0006, F0007 | P004 | — |
| U003 | — | F0006 | P005 | Y001 |
| ..... | ..... | ..... | ..... | ..... |

FIG. 4

CONTROL INFORMATION　　　141

| P001 | | |
|---|---|---|
| OPERATION INFORMATION ||| 
| EXECUTION NUMBER | OPERATION INSTRUCTION | DETAILED INFORMATION |
| 1 | MOSAIC PROCESSING | CONDITION (PATTERN IMAGE MATCH) SIZE (5) |
| 2 | RECORD | MEMORY CARD |

FIG. 5

CONTROL INFORMATION　　　142

| P003 | | |
|---|---|---|
| OPERATION INFORMATION |||
| EXECUTION NUMBER | OPERATION INSTRUCTION | DETAILED INFORMATION |
| 1 | IMAGE REPLACEMENT | CONDITION (PATTERN IMAGE MATCH) CG DATA IDENTIFIER (CG004) |
| 2 | RECORD | INSIDE DIGITAL CAMERA |

FIG. 6

| P002 | CONTROL INFORMATION | 143 |

| OPERATION INFORMATION |||
|---|---|---|
| EXECUTION NUMBER | OPERATION INSTRUCTION | DETAILED INFORMATION |
| 1 | INFORMATION ATTACHMENT | CONDITION (PATTERN IMAGE MATCH) ATTACHED INFORMATION IDENTIFIER (X001) |
| 2 | RECORD | INSIDE DIGITAL CAMERA |

FIG. 7

| P004 | CONTROL INFORMATION | 144 |

| OPERATION INFORMATION |||
|---|---|---|
| EXECUTION NUMBER | OPERATION INSTRUCTION | DETAILED INFORMATION |
| 1 | FRAME DELETION | CONDITION (PATTERN IMAGE NON-MATCH) |
| 2 | RECORD | INSIDE DIGITAL CAMERA |

FIG. 8

CONTROL INFORMATION 145

P005

| OPERATION INFORMATION | | |
|---|---|---|
| EXECUTION NUMBER | OPERATION INSTRUCTION | DETAILED INFORMATION |
| 1 | MOSAIC PROCESSING | CONDITION (PATTERN IMAGE A MATCH) SIZE (4) |
| 2 | IMAGE REPLACEMENT | CONDITION (PATTERN IMAGE B MATCH) REPLACEMENT IMAGE IDENTIFIER (G001) |
| 3 | FRAME DELETION | CONDITION (PATTERN IMAGE C MATCH) |
| 4 | RECORD | MEMORY CARD |

FIG. 9

ATTACHED INFORMATION 151

X001

| OPERATION INFORMATION | | |
|---|---|---|
| EXECUTION NUMBER | OPERATION INSTRUCTION | DETAILED INFORMATION |
| 1 | MOSAIC PROCESSING | RANGE INFORMATION ((9999, 9999) − (9999, 9999)), SIZE (2) |

FIG. 10

| | ATTACHED INFORMATION 152 | |
|---|---|---|
| Y001 | | |
| \multicolumn{3}{c}{OPERATION INFORMATION} | | |
| EXECUTION NUMBER | OPERATION INSTRUCTION | DETAILED INFORMATION |
| 1 | IMAGE REPLACEMENT | RANGE INFORMATION ((9999, 9999) - (9999, 9999)), CG DATA IDENTIFIER(CG005) |
| 2 | ENCRYPTION | ALGORITHM(DES) |

POWER CIRCUIT

FIG. 19

| X001 | ATTACHED INFORMATION | 151a |
|---|---|---|

| OPERATION INFORMATION | | |
|---|---|---|
| EXECUTION NUMBER | OPERATION INSTRUCTION | DETAILED INFORMATION |
| 1 | MOSAIC PROCESSING | RANGE INFORMATION ((010,010) - (020,020)), SIZE(2) |

FIG. 20

| Y001 | ATTACHED INFORMATION | 152a |
|---|---|---|

| OPERATION INFORMATION | | |
|---|---|---|
| EXECUTION NUMBER | OPERATION INSTRUCTION | DETAILED INFORMATION |
| 1 | IMAGE REPLACEMENT | RANGE INFORMATION ((020,020) - (035,035)), CG DATA IDENTIFIER(CG005) |
| 2 | ENCRYPTION | ALGORITHM(DES) |

FIG. 21

| Z001 | ATTACHED INFORMATION | /— 153 |

| OPERATION INFORMATION |||
|---|---|---|
| EXECUTION NUMBER | OPERATION INSTRUCTION | DETAILED INFORMATION |
| 1 | MOSAIC PROCESSING | COPY COUNT (1 – 4) : RANGE INFORMATION((010,010) – (020,020)), SIZE(1) COPY COUNT (5 – 10) : RANGE INFORMATION((010,010) – (020,020)), SIZE(3) COPY COUNT (11 – ) : RANGE INFORMATION((000,000) – (999,999)), SIZE(5) |

FIG. 22

| Z002 | ATTACHED INFORMATION | /— 154 |

| OPERATION INFORMATION ||
|---|---|
| EXECUTION NUMBER | OPERATION INSTRUCTION | DETAILED INFORMATION |
| 1 | COPY COUNT (1 – 4) : MOSAIC PROCESSING | RANGE INFORMATION ((010,010) – (020,020)), SIZE(3) |
|  | COPY COUNT (5 – 10) : IMAGE REPLACEMENT | RANGE INFORMATION ((010,010) – (020,020)), CG DATA IDENTIFIER(CG009) |
|  | COPY COUNT (11 – ) : FRAME DELETION |  |

FIG. 23

| ATTACHED INFORMATION | | ~155 |
|---|---|---|
| Z003 | | |

| OPERATION INFORMATION | | |
|---|---|---|
| EXECUTION NUMBER | OPERATION INSTRUCTION | DETAILED INFORMATION |
| 1 | MOSAIC PROCESSING | COPY PERIOD (2005.10.01 - 2005.10.31) RANGE INFORMATION((010,010) - (020,020)), SIZE(1) COPY PERIOD (2005.11.01 - 2005.11.30) RANGE INFORMATION((010,010) - (020,020)), SIZE(3) COPY PERIOD (2005.12.01 - ) RANGE INFORMATION((000,000) - (999,999)), SIZE(5) |

FIG. 24

| ATTACHED INFORMATION | | ~156 |
|---|---|---|
| Z004 | | |

| OPERATION INFORMATION | | |
|---|---|---|
| EXECUTION NUMBER | OPERATION INSTRUCTION | DETAILED INFORMATION |
| 1 | COPY PERIOD (2005.10.01 - 2005.10.31) : MOSAIC PROCESSING | RANGE INFORMATION ((010,010) - (020,020)), SIZE(3) |
| | COPY PERIOD (2005.11.01 - 2005.11.30) : IMAGE REPLACEMENT | RANGE INFORMATION ((010,010) - (020,020)), CG DATA IDENTIFIER(CG009) |
| | COPY PERIOD (2005.12.01 - ) : FRAME DELETION | |

FIG. 25

| | ATTACHED INFORMATION | ~157 |
|---|---|---|
| Z005 | | |

| OPERATION INFORMATION ||| 
|---|---|---|
| EXECUTION NUMBER | OPERATION INSTRUCTION | DETAILED INFORMATION |
| 1 | COPY COUNT (1 - 4)<br>: MOSAIC PROCESSING | RANGE INFORMATION<br>((010,010) - (020,020)),<br>SIZE(3) |
| | COPY COUNT (5 - 10)<br>: IMAGE REPLACEMENT | RANGE INFORMATION<br>((010,010) - (020,020)),<br>CG DATA IDENTIFIER(CG009) |
| | COPY PERIOD (2005.12.01 - )<br>: FRAME DELETION | |

IMAGE PROCESSING APPARATUS

BACKGROUND OF THE INVENTION

1. Field of Invention

The present invention relates to an image processing technique for performing image processing on an image obtained by photography.

2. Description of the Related Art

Digital cameras that generate image data according to photography using a solid-state imaging device such as a CCD (charge coupled device) and record the image data on a memory card are coming into wide-spread use.

Patent Document 1, which discloses a video information processing apparatus, has objects of realizing a camera that is capable of easily realizing rearrangement of generated video, realizing a camera that records video with information about the video multiplexed therewith, realizing a camera that has a function of conveying the will of a subject without notifying people around him/her of it (i.e., the will of the subject), and realizing a camera that is capable of easily confirming that a desired subject reliably falls within a captured image. To this end, the video information processing apparatus receives input of video, stores identification information corresponding to a blinking pattern of a light source, converts the identification information to identification information corresponding to the blinking pattern of the light source blinking in the input video, and outputs the converted identification information together with the input video.

Furthermore, Patent Document 2 discloses a camera that enables a setting of permission or prohibition of photography to be made easily and reliably, and that further has a photography permission function that enables a charge to be made according to the value of the subject. According to this technique, a photography permission signal specified by code is transmitted to a transmitter/receiver provided in a vicinity of the subject whose charge is individually set. Once the photography permission signal which is sent back by the transmitter/receiver is received, a shutter control means allows a shutter to operate to take a picture. When a contract is made or after the photograph is taken, the photograph is charged for according to data stored in a storage means. This effectively prevents a subject other than a subject which is allowed to be photographed in advance from being photographed.

Patent Document 3 discloses an information processing apparatus that can easily and effectively embed predetermined information for protecting the copyright, etc., of the objective information of digital watermarking, etc., in the objective information without deterioration of the objective information. According to this technique, at the time of recording the predetermined information for protecting the copyright of the objective information (photographic image) generated based on a photographing operation from the user (photographer), a recording means acquires bio-information on the user and, when the bio-information is already registered, records user information related to the bio-information in the objective information as the predetermined information at the time of registering the objective information.

Patent Document 1: Japanese Patent Application Publication No. 2001-320702.

Patent Document 2: Japanese Patent Application Publication No. 2002-182275.

Patent Document 3: Japanese Patent Application Publication No. 2003-204427.

BRIEF SUMMARY OF THE INVENTION

Problem to be Solved by the Invention

However, while the conventional techniques have effects as enabling generated video to be easily rearranged, enabling photography prohibition/permission settings to be easily made, and enabling predetermined information to be easily buried in an image to protect copyright, there are demands for even more diverse techniques to protect the portrait rights, security, privacy and the like of photographed subjects such as people and buildings, and to enable image data generated by photography to be easily rearranged.

In order to deal with such demands, the present invention has an object of providing an image processing apparatus, a server apparatus, an image photography apparatus, an image processing system, an image processing method, and an image processing program that enable easy handling of image data after photography.

Means to Solve the Problem

In order to achieve the stated object, the present invention is an image processing apparatus that performs image processing on a photographic image according to a result of a comparison of the photographic image with a reference image. The image processing apparatus includes: a first image storage unit operable to store the photographic image generated by photography; an instruction storage unit operable to store a processing instruction that instructs image processing; a second image storage unit operable to store the reference image which has been generated in advance; a judgment unit operable to judge whether a portion that corresponds to the reference image exists in the photographic image; and an execution unit operable to, according to a result of the judgment, perform the image processing on the photographic image in accordance with the processing instruction.

Effects of the Invention

According to the stated structure, image processing is performed depending on whether the reference image appears in the photographic image. Therefore, image processing can be performed appropriately without the user viewing the photographic image, and hence enables photographed image data to be handled more easily.

Here, the image processing apparatus may further include: a photography unit operable to generate the photographic image by photographing an object, and write the generated photographic image to the first image storage unit.

According to the stated structure, due to the image processing apparatus having a photography unit, image processing depending on whether the reference image appears in the photographic image can be performed substantially simultaneously with photographing.

Here, the image processing apparatus may be connected to a server apparatus via a network, and may further include: a photography unit operable to generate the photographic image by photographing an object; a transmission unit operable to transmit the generated photographic image to the server apparatus via the network; a reception unit operable to receive the photographic image from the server via the network; and a write unit operable to write the received photographic image to the first image storage unit, wherein the server apparatus receives the photographic image, stores the photographic image, and transmits the photographic image.

According to this stated structure, a subject is photographed to generate the photographic image, the generated photographic image is transmitted to the server apparatus via the network, the photographic image is received from the server apparatus via the network, and the received photographic image is written to the first image storage unit. This enables a photographic image to be stored temporarily in the server apparatus, and consequently large numbers of photographic images can be generated even if the image processing apparatus does not have a large-capacity storage unit.

Here, the image processing apparatus may be connected to a photographic apparatus via a network, the photographic apparatus may generate the photographic image by photographing an object, and transmit the generated photographic image to the image processing apparatus via the network. Further, the image processing apparatus may include: a reception unit operable to receive the photographic image from the photographic apparatus via the network; and a write unit operable to write the received photographic image to the first image storing unit.

According to the stated structure, the image processing apparatus receives the photographic image from the photographic apparatus via the network and writes the received photographic image to the first image storage unit. Therefore, image processing depending on whether the reference image appears in the photographic image can be performed on the image data generated by the photographic apparatus even if the photographic apparatus is provided at a location that is a considerable distance from the image processing apparatus.

Here, the image processing apparatus may be connected to a server apparatus via a network, the server apparatus may store therein in advance the processing instruction and the reference image, and transmit the processing instruction and the reference image to the image processing apparatus in response to a request from the image processing apparatus. Further, the image processing apparatus may include: a transmission unit operable to transmit the request for the processing instruction and the reference image to the server apparatus; a reception unit operable to receive the processing instruction and the reference image from the server apparatus; and a write unit operable to write the received processing instruction to the instruction storage unit, and write the received reference image to the second image storage unit.

According to the stated structure, since image processing apparatus receives the processing instruction and the reference image from the server apparatus and stores them internally, the image processing apparatus is able to use a large number of processing instructions and reference images even if it does not have a large-capacity storage unit.

Here, the transmission unit may transmit the request for the processing instruction and the reference image that meet a predetermined condition.

According to the stated structure, the image processing apparatus transmits a request for the processing instruction and the reference image that meet the predetermined condition, and therefore a processing instruction and a reference image that meet a predetermined condition can be obtained.

Here, the predetermined condition may be that the processing instruction and the reference image relate to a user of the image processing apparatus, the transmission unit may transmit the request for the processing instruction and the reference image that relate to the user of the image processing apparatus, and the server apparatus, which may store in advance the processing instruction and the reference image that relate to the user, may transmit the processing instruction and the reference image.

According to the stated structure, the image processing apparatus receives a processing instruction and a reference image relating to the user of the image processing apparatus, and therefore a processing instruction and reference image that are appropriate to the user can be obtained.

Here, the predetermined condition may be that the processing instruction and the reference image correspond to a user identifier that identifies the user of the image processing apparatus, the transmission unit may transmit, as the request, the user identifier that identifies the user, and the server apparatus, which may store in advance the processing instruction and the reference image in correspondence with the user identifier, may extract the processing instruction and the reference image that correspond to the received user identifier, and may transmit the extracted processing instruction and reference image.

According to the stated structure, the image processing apparatus receives a processing instruction and a reference image that correspond to the user identifier that identifies the user of the image processing apparatus. This ensures that a processing instruction and reference image that are appropriate to the user are obtained.

Here, the predetermined condition may be that the processing instruction and the reference image relate to the image processing apparatus, the transmission unit may transmit the request for the processing instruction and the reference image relating to the image processing apparatus, and the server apparatus, which may store in advance the processing instruction and the reference image relating to the image processing apparatus, may transmit the processing instruction and the reference image.

According to the stated structure, the image processing apparatus receives a processing instruction and a reference image relating to the image processing apparatus, and therefore a processing instruction and reference image that are appropriate to the image processing apparatus can be obtained.

Here, the predetermined condition may be that the processing instruction and the reference image correspond to an apparatus identifier that identifies the image processing apparatus, the transmission unit may transmit, as the request, the apparatus identifier that identifies the image processing apparatus, and the server apparatus, which may store in advance the processing instruction and the reference image in correspondence with the apparatus identifier, may extract the processing instruction and the reference image that correspond to the received apparatus identifier, and transmit the extracted processing instruction and reference image.

According to the stated structure, the image processing apparatus receives a processing instruction and a reference image that correspond to the apparatus identifier that identifies the image processing apparatus. This ensures that a processing instruction and reference image that are appropriate to the image processing apparatus are obtained.

Here, the predetermined condition may be that the processing instruction and the reference image relate to a subject that is a target of photography, the transmission unit may transmit the request for the processing instruction and the reference image that relate to the subject, and the server apparatus, which may store in advance the processing instruction and the reference image that relate to the subject, may transmit the processing instruction and the reference image.

According to the stated structure, the image processing apparatus receives a processing instruction and a reference image relating to the subject, and therefore a processing instruction and reference image that are appropriate to the subject can be obtained.

Here, the predetermined condition may be that the processing instruction and the reference image correspond to a tag identifier that identifies an IC tag (e.g., a tag for radio frequency generation) attached to the subject, and the image processing apparatus may further include: an obtaining unit operable to obtain the tag identifier that identifies the IC tag that is attached to the subject, from the IC tag, wherein the transmission unit transmits, as the request, the obtained tag identifier, and the server apparatus, which may store in advance the processing instruction and the reference image in correspondence with the tag identifier, may extract the processing instruction and the reference image that correspond to the received tag identifier, and transmit the extracted processing instruction and reference image.

According to the stated structure, the image processing apparatus receives a processing instruction and a reference image that correspond to the identifier that identifies the IC tag. This ensures that a processing instruction and reference image that are appropriate to the subject are obtained.

Here, the transmission unit may transmit the request for the processing instruction and the reference image to the server apparatus as needed.

According to the stated structure, the image processing apparatus receives a processing instruction and a reference image as needed, and therefore image processing depending on whether the reference image appears in the photographic image can be performed at any time.

Here, the transmission unit may repeatedly transmit the request for the processing instruction and the reference image to the server apparatus at a regular interval.

According to the stated structure, the image processing apparatus repeatedly receives a processing instruction and a reference image at regular intervals, and therefore image processing depending on whether the reference image appears in the photographic image can be performed without increasing the amount of communication between the server apparatus and the image processing apparatus.

Here, when the judgment unit judges that a portion that corresponds to the reference image exists in the photographic image, the execution unit may perform the image processing on the portion that corresponds to the reference image.

According to the stated structure, when the reference image appears in the photographic image, image processing can be performed on the portion in which the reference image appears. Therefore, appropriate image processing can be performed on the portion without the photographic image being viewed.

Here, the image processing instructed by the processing instruction may be mosaic processing, and the execution unit may perform the mosaic processing on the portion that corresponds to the reference image.

According to the stated structure, the portrait rights, privacy, security and the like of the portion of the photographic image that in which the reference image appears are protected because mosaic processing is performed thereto, and therefore the portion is not clearly shown to other people.

Here, the image processing instructed by the processing instruction may be image overwriting processing, and the execution unit may perform the image overwriting processing on the portion that corresponds to the reference image.

According to the stated structure, image overwriting processing is performed on the portion in which the reference image appears. By overwriting this portion with another image, the portrait rights, privacy, security and the like are protected.

Here, the image processing may be image overwriting processing that is achieved by computer graphic processing, and the execution unit may perform computer graphic processing on the portion that corresponds to the reference image.

According to the stated structure, the image overwriting processing is performed on the portion in which the reference image appears by performing computer graphic processing on the portion. This ensures that the portion is replaced with another image.

Here, the image processing may be image overwriting processing that is achieved by replacement with another image, and the execution unit may replace the portion that corresponds to the reference image with the other image.

According to the stated processing, the image overwriting processing is performed on the portion in which the reference image appears by replacing the portion with another image. This ensures that the portion is replaces with another image.

Here, the image processing instructed by the processing instruction may further include encryption processing, and the execution unit may further, in accordance with the encryption processing included in the processing instruction, perform the encryption processing on the photographic image, thereby generating an encrypted image.

According to the stated structure, encryption processing is performed on the photographic image to generate an encrypted image. This means that the original image can be stored safely.

Here, the execution unit may perform the encryption processing with use of two keys that are respectively held by two different parties.

According to the stated structure, encryption processing is performed based on two keys that are held respectively by two different parties. Therefore, the encrypted image can be limited to being decrypted when a condition is met that the two separately-held keys are brought together.

Here, the image processing instructed by the processing instruction may be information attachment, and the execution unit may attach, to the photographic image, control information that includes the processing instruction that instructs the image processing.

According to the stated structure, control information that includes a processing instruction instructing image processing is attached to the photographic image. Therefore, image processing can be performed on the photographic image when it is reproduces, copied or the like. In this way, By overwriting this portion with another image, the portrait rights, privacy, security and the like of the subject are protected.

Here, the execution unit may attach the control information to the photographic image by embedding the control information in the photographic image as a digital watermark.

According to the stated structure, the control information is embedded in the photographic image as a digital signature. This means that the control information can be embedded in the photographic image with relatively little deterioration in the photographic image, and also makes it difficult to remove only the control information from the photographic image.

Here, the execution unit may perform the image processing when the judgment unit judges that a portion that corresponds to the reference image does not exist in the photographic image.

According to the stated structure, image processing is performed on the photographic image when the reference image does not appear in the photographic image. This means that appropriate image processing can be performed on the photographic image without the user viewing the photographic image.

Here, the image processing instructed by the processing instruction may be image deletion, and the execution unit may delete the stored photographic image from the first image stored unit.

According to the stated structure, the photographic image is deleted when the reference image does not appear in the photographic image. This means that unnecessary the photographic image can be deleted.

Here, the image processing apparatus may further include: a photography unit operable to generate the photographic image by photographing an object, and write the generated photographic image to the first image storage unit, wherein the judgment unit performs the judgment when the photography unit generates the photographic image.

According to the stated structure, when a photographic image is generated by the photography unit, it is judged whether or not a portion corresponding to the reference image exists in the photographic image. This ensures that image processing is performed in accordance with the comparison result directly after photography.

Here, the image processing apparatus may further include: an output unit operable to output the stored photographic image to an external destination, wherein the judgment unit performs the judgment when the output unit is to output the photographic image, and the output unit outputs the photographic image on which the image processing has been performed.

According to the stated structure, when outputting a photographic image to an external destination, it is judged whether or not a portion that corresponds to the reference image exists in the photographic image. This ensures that image processing is performed in accordance with the comparison result when a photographic image is being output to an external destination. In this way, a restriction can be added to a photographic image that is output to an external destination.

Here, the image processing apparatus may further include: a location obtaining unit operable to obtain a present location at which the image processing apparatus is located; and a range judgment unit operable to judge whether or not the obtained present location is outside a predetermined range, wherein, when the range judgment unit judges that the present location is outside the predetermined range, the judgment unit performs the judgment of whether a portion that corresponds to the reference image exists in the photographic image.

According to the stated structure, when it is judged that the image processing apparatus is in a location outside of a predetermined range, a judgment is made as to whether or not a portion of the photographic image corresponds to the reference image. This ensures that image processing is performed in accordance with the comparison result when a photographic image is being output to an external destination. In this way, a restriction can be added to a photographic image that is output to an external destination.

Furthermore, the present invention is a server apparatus including: a storage unit operable to store a reference image generated in advance, and a processing instruction that instructs image processing; a reception unit operable to receive a transmission request for the reference image and the processing instruction from an image processing apparatus connected to the server apparatus via a network; a reading unit operable to, upon the reception unit receiving the transmission request, read the reference image and the processing instruction from the storage unit; and a transmission unit operable to transmit the read reference image and processing instruction to the image processing apparatus via the network.

The stated structure ensures that that the reference image and the processing instruction are transmitted to the image processing apparatus via the network.

Here, the reception unit may receive the request for the processing instruction and the reference image that meet a predetermined condition, and the reading unit may read the processing instruction and the reference image that meet the predetermined condition from the storage unit.

According to the stated structure, a reference image and processing instruction that meet the predetermined condition can be transmitted.

BRIEF DESCRIPTION OF THE DRAWINGS

FIG. 3 shows an example of the data structure of a user information table 121 stored in an information storage unit 103;

FIG. 4 shows an example of control information 141 stored in the information storage unit 103;

FIG. 5 shows an example of control information 142 stored in the information storage unit 103;

FIG. 6 shows an example of control information 143 stored in the information storage unit 103;

FIG. 7 shows an example of control information 144 stored in the information storage unit 103;

FIG. 8 shows an example of control information 145 stored in the information storage unit 103;

FIG. 9 shows an example of attached information 151 stored in the information storage unit 103;

FIG. 10 shows an example of attached information 152 stored in the information storage unit 103;

FIG. 19 shows an example of the data structure of attached information 151a;

FIG. 20 shows an example of the data structure of attached information 152a;

FIG. 21 shows an example of the data structure of attached information 153;

FIG. 22 shows an example of the data structure of attached information 154;

FIG. 23 shows an example of the data structure of attached information 155;

FIG. 24 shows an example of the data structure of attached information 156; and

FIG. 25 shows an example of the data structure of attached information 157.

DESCRIPTION OF NUMERIC REFERENCES

Figure 1:
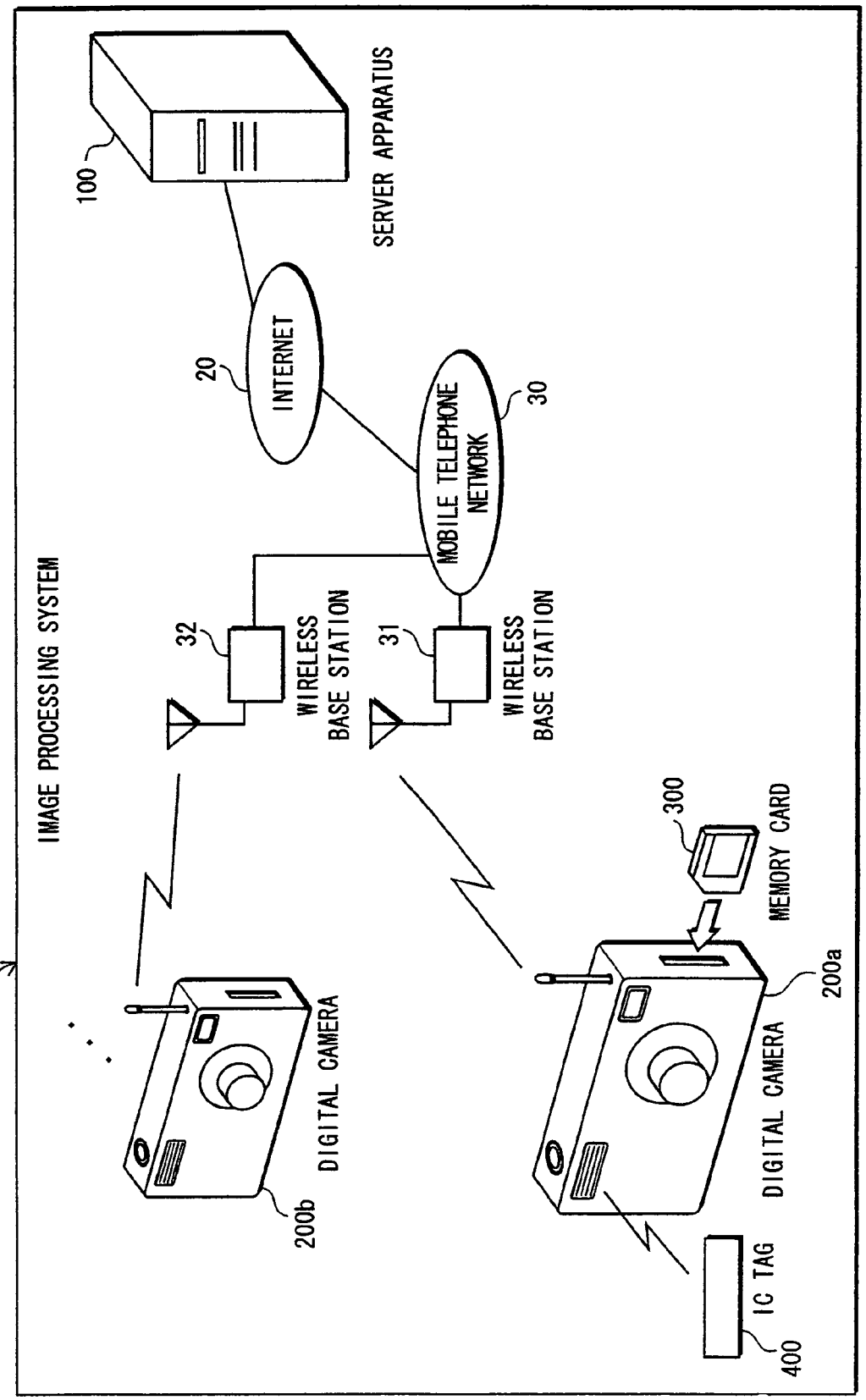
FIG. 1 shows the structure of an image processing system 10 as a first embodiment of the present invention.

10 Image processing system
20 The Internet

30 Mobile telephone network
31 Wireless base station
100 Server apparatus
101 Control unit
102 Transmission/reception unit
103 Information storage unit
111 Display unit
112 Input unit
200 Digital camera
200a, 200b, . . . . Digital cameras
201 Image storage unit
202 Photography unit
203 Image processing unit
204 Information storage unit
205 Image display unit
206 Wireless control unit
207 Wireless communication unit
208 Control unit
209 Display unit
210 Input unit
211 Short-distance communication control unit
212 Short-distance communication unit
213 Authentication unit
214 Input/output unit
215 Antenna
216 Antenna
217 Encryption unit
218 LSI unit
300 Memory card
301 Input/output unit
302 Authentication unit
303 Information storage unit
304 Control unit
400 IC tag
401 Antenna unit
402 Demodulation unit
403 Modulation unit
404 Power unit
405 Control unit
406 Identification code storage unit
407 Input/output unit
408 Memory unit
410 IC chip unit

DETAILED DESCRIPTION OF THE INVENTION

1. Image Processing System 10

The following describes an image processing system 10 as a first embodiment of the present invention.

1.1 Structure of the Image Processing System 10

As shown in FIG. 1, the image processing system 10 is composed of a server apparatus 100 and a plurality of digital cameras 200a, 200b, . . . . The server apparatus 100 and the digital cameras 200a, 200b, . . . are connected via the Internet 20 and a mobile telephone network 30.

A user photographs at least one of various objects (also referred to as subjects). One or more of the objects has an IC tag 400 attached thereto which is capable of wireless communication using radio waves, in other words, capable of non-contact communication. The IC tag 400 stores a tag identifier that identifies the IC tag 400.

In response to a user operation, the digital camera 200a photographs at least one of these objects, and generates image data. When photographing the object, the digital camera 200a uses wireless communication to obtain the tag identifier from the IC tag 400, if the object to which the IC tag 400 is attached exists in a predetermined communication range of the digital camera 200a.

The digital camera 200a stores therein in advance a user identifier that identifies the user. Upon photographing an object, the digital camera 200a transmits the user identifier and the obtained tag identifier (in the case of a tag identifier being obtained) to the server apparatus 100 via a wireless base station 31, the mobile telephone network 30 and the Internet 20.

The server apparatus 100 stores therein user identifiers identifying users and tag identifiers identifying IC tags. These user identifiers and tag identifiers are stored in correspondence with pattern images, control information and attached information. The pattern images are image data, and the control information and the attached information each include an operation instruction instructing mosaic processing, image replacement and the like to be performed on image data generated as a result of photography. The mosaic processing, image replacement and the like are described later.

If a pattern image exists that corresponds to the received user identifier, or the received user identifier and tag identifier, the server apparatus 100 extracts the pattern image, and transmits the extracted pattern image to the digital camera 200a via the Internet 20, the mobile telephone network 30 and the wireless base station 31.

The digital camera 200a searches the image data that it has generated as a result of photography, to find any portion that matches the received image pattern. If a matching portion exists, the digital camera 200a requests a control information and attached information from the server apparatus 100, and the server apparatus 100 transmits the corresponding control information, or the corresponding control information and attached information, to the digital camera 200a.

The digital camera 200a performs processing on the generated image data in accordance with the operation instructions included in the received control information, or included in the received control information and attached information. For instance, the digital camera 200a performs mosaic processing on the portion that matches the received pattern image, or replaces the portion with other image data. The digital camera 200a then writes the image data resulting from the processing to a memory card 300.

1.2 Structure of the Server Apparatus 100

Figure 2:
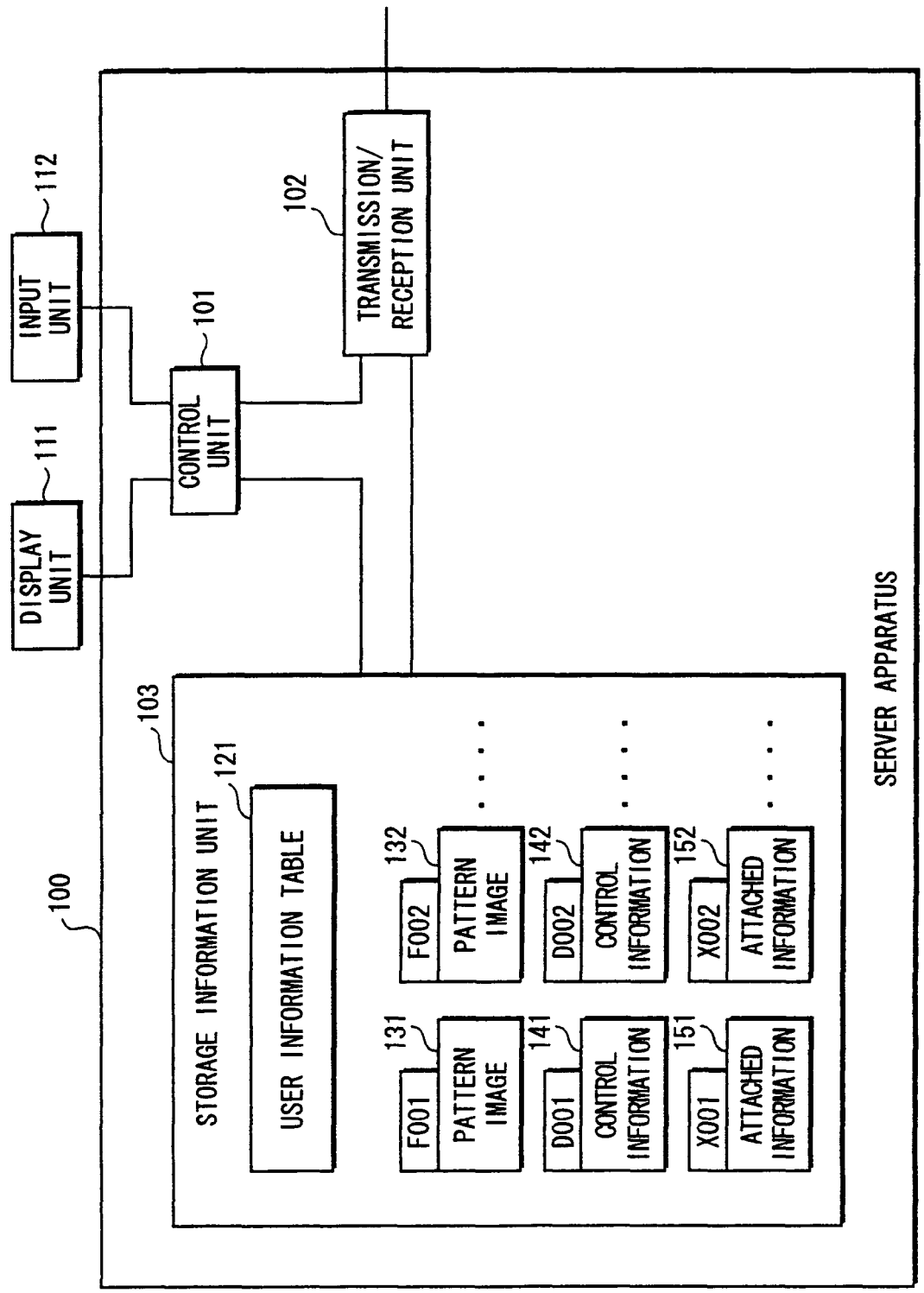
FIG. 2 is a block diagram showing the structure of a server apparatus 100.

As shown in FIG. 2, the server apparatus 100 is composed of a control unit 101, a transmission/reception unit 102, and an information storage unit 103. The server apparatus 100 is connected to a display unit 111 and an input unit 112.

The server apparatus 100 is, specifically, a computer system that includes a microprocessor, a ROM, a RAM, a hard disk unit, a communication unit, a display unit, a keyboard, and a mouse. Computer programs are stored in the RAM or the hard disk unit, and the server apparatus 100 achieves its functions by the microprocessor operating according to the computer programs.

(1) Information Storage Unit 103

As shown in FIG. 2, the information storage unit 103 stores in advance a user information table 121, pattern images 131, 132, . . . , control information 141, 142, . . . , and attached information 151, 152, . . . .

User Information Table 121

The user information table 121 is composed of a plurality of pieces of user information, as the example of the data structure of the user information table 121 in FIG. 3 shows.

The one or more pieces of user information in the user information table 121 correspond to one user.

Each piece of user information includes a user identifier, one or more pattern image identifiers, and one control information identifier. One or more of the pieces of user information further include a tag identifier, and one or more of the pieces of the user information further include an attached information identifier.

The user identifier is identification information that uniquely identifies the user of one of the digital cameras.

The pattern image identifier is identification information that uniquely identifies a respective one of the pattern images stored in the information storage unit 103.

The tag identifier is identification information that uniquely identifies an IC tag. A description of IC tags is given later.

The control information identifier is identification information that uniquely identifies a respective piece of the control information stored in the information storage unit 103.

The attached information identifier is identification information that uniquely identifies a respective piece of the attached information stored in the information storage unit 103.

Pattern Images 131, 132, . . . .

Each of the pattern images 131, 132, . . . is image information that has been generated by highly-efficiently compressing image data obtained by one of the digital cameras, or part of image data obtained by one of the digital cameras. This compression is performed using a method that conforms to the JPEG (Joint Photographic Experts Group) standard.

As one example, each of the pattern images 131, 132, . . . is image data obtained by photographing a different one of various people (person A, person B, . . . ) from the front.

As an alternative example, each of the pattern images 131, 132, . . . may be image data obtained by photographing a different one of various parts of person A from the front. Examples of the various parts include the whole of person A, the upper half of person A, and the head of person A.

As yet a further example, each of the pattern images 131, 132, . . . may be image data obtained by photographing the head of person A from different angles. Examples include the head photographed from the front, from a 45 degree angle to the left, from a 45 degree angle to the right, from the side, from a 45 degree angle above the front of the head, and from a 45 degree angle below the front of the head.

Furthermore, each of the pattern images 131, 132, . . . may be image data obtained by photographing a different one of structural objects A, B, . . . from the front. Examples of such structural objects include buildings, temples, towers, bridges, airplanes, trains, and automobiles.

The pattern images 131, 132, . . . may include all of the above examples.

Control Information 141, 142, . . . .

Each piece of control information is composed of a plurality of pieces of operation information, and each piece of operation information includes an execution number, a operation instruction, and detailed information.

Specifically, each piece of control information is a computer program, and each piece of operation information is a computer instruction in a machine language format. The machine language format is a format that the digital cameras are capable of decoding and executing, and the pieces of control information are used by the digital cameras.

In the following description of contents of the control information, instead of using expressions relating to machine language format instructions, the operation instructions and detailed information are expressed using terminology more commonly used by humans, as shown in FIGS. 4 to 8.

Each execution number is a number showing a position of the corresponding operation instruction in an order of execution of the operation instructions in the digital cameras. An operation instruction corresponding to an execution number "1" is executed first, a operation instruction corresponding to an execution number "2" is executed next, and thereinafter subsequent operation instructions are executed in the order shown by the execution numbers.

Each operation instruction is an instruction that instructs an operation to a digital camera, and each piece of detailed information is information that is designated in association with the operation instructions. Specific examples of operation instructions include a mosaic processing instruction, a recording instruction, an image replacement instruction, an information attachment instruction, and a frame delete instruction.

The following describes the operation instructions and the corresponding detailed information.

(a) Mosaic Processing Instruction

The mosaic processing instruction is an instruction that instructs that mosaic processing is to be performed on all or part of image data obtained as a result of photography by a digital camera (or image data in a state directly before mosaic processing being performed, in other words, image data that has already had other processing performed thereon).

Here, mosaic processing is processing for dividing part or all of image data generated by photography into a plurality of rectangular (square) block areas, selecting one pixel in each block area, and writing back each block area with the pixel value of the selected pixel as the pixel value of all other pixels in the block area. As one example, the pixel selected here may be the top left pixel in the block area.

Note that instead of the pixel value of the selected pixel, an average pixel value of pixels in a specific range in the block area may be used.

The detailed information includes a condition and a size.

The condition shows a condition to be met in order for the mosaic processing instruction to be executed.

One example of the condition is "pattern image match". As is described in detail later, in the case of this condition, if a portion of the image data generated by photography by the camera is judged to match any of the pattern images, the mosaic processing instruction is performed with respect to the portion of the image data. If no portion that matches the pattern image exists in the image data, the mosaic processing instruction is not executed. Here, the pattern image is a separately designated image.

A further example of the condition is "pattern image A match". In the case of this condition, if a portion of the image data generated by photography by the camera is judged to match a pattern image A, the mosaic processing instruction is performed with respect to the portion of the image data. If no portion that matches the pattern image A exists in the image data, the mosaic processing instruction is not executed. Here, the pattern image A is an image designated in the condition.

The size shows the size of the block area. For instance, sizes "5", "4", "3" and "2" may show block areas of 64*64 pixels, 32*32 pixels, 16*16 pixels, and 8*8 pixels, respectively. Here, a block area of a*a pixels denotes a group consisting of total of a*a pixels (a pixels vertically and a pixels horizontally) arranged in a matrix formation.

In the case of the described mosaic processing, the original image data is more visually-recognizable if the aforementioned size is smaller, and the original image is less visually recognizable if the aforementioned size is larger.

(b) Recording Instruction

The recording instruction is an instruction that instructs that JPEG or MPEG 4 (Moving Pictures Experts Group 4) image compression is to be performed on all or part of image data obtained as a result of photography by a digital camera (or image data in a state directly before processing being performed, in other words, image data that has already had other processing performed thereon), to generate compressed image data, and the generated compressed image data is to be written to a designated storage area. Here, it is an operational instruction by the user with respect to the digital camera that determines whether it is JPEG that is used or MPEG 4 that is used. Specifically, JPEG is used if the user instructs still image photography, and MPEG 4 is used if the user instructs moving image photography.

The detailed information designates a recording destination of generated compressed image data. More specifically, this recording destination is the information storage unit 204 in the digital camera, or the memory card 300.

(c) Image Replacement Instruction

The image replacement instruction is an instruction that instructs that all or part of image data obtained as a result of photography by a digital camera (or image data in a state directly before processing being performed, in other words, image data that has already had other processing performed thereon) is to be rewritten into designated image data (replacement image data) or overwritten with designated image data.

The detailed information includes a condition and an image data identifier.

The image data identifier is identification information identifying the designated image data (replacement image data). The designated image data may, for instance, be compressed image data generated according to the JPEG standard, or CG (computer graphics) image data generated with use of CG.

The condition shows a condition to be met in order for the image replacement instruction to be executed.

One example of the condition is "pattern image match". As is described in detail later, in the case of this condition, if a portion of the image data generated by photography by the camera is judged to match any of the pattern images, the image replacement instruction is performed with respect to the portion of the image data. If no portion that matches the pattern image exists in the image data, the image replacement instruction is not executed. Here, the pattern image is a separately designated image.

A further example of the condition is "pattern image A match". In the case of this condition, if a portion of the image data generated by photography by the camera is judged to match a pattern image A, the image replacement instruction is performed with respect to the portion of the image data. If no portion that matches the pattern image A exists in the image data, the image replacement instruction is not executed. Here, the pattern image A is an image designated in the condition.

(d) Information Attachment Instruction

The information attachment instruction is an instruction that instructs that attached information is to be attached to compressed image data generated by the digital camera.

The detailed information includes an attached information identifier that identifies a piece of attached information to be attached.

The attached information is described in detail later.

(e) Frame Delete Instruction

The frame delete instruction is an instruction that instructs that, when a plurality of frame images are obtained by photography by the digital camera, any of the frame images that meet a designated condition is to be deleted.

The detailed information includes a condition. A frame image is deleted if it meets the condition.

One example of the condition is "pattern image non-match". As is described in detail later, in the case of this condition, if a portion of a frame image generated by photography by the camera is judged to not match any of the pattern images, the frame image is deleted.

Examples of Control Information 141, 142, . . . .

As shown as one example in FIG. 4, the control information 141 is composed of a mosaic processing instruction and a recording instruction. The detailed information corresponding to the mosaic processing instruction includes the condition "pattern image match" and the mosaic block size "5". The recording instruction designates a memory card as the recording destination.

When the control information 141 is executed, if a portion of image data obtained by photography by the digital camera is judged to match a pattern image, the mosaic processing instruction with the block size is "5" is executed with respect to the portion of the image data, and the image data on which the mosaic processing has been performed is written to the memory card.

Furthermore, as shown as one example in FIG. 5, the control information 142 is composed of an image replacement instruction and a recording instruction. The detailed information corresponding to the image replacement instruction includes a condition "pattern image match" and a CG identifier "CG004". The recording instruction designates the digital camera as the recording destination.

When the control information 142 is executed, if a portion of image data obtained by photography by the digital camera is judged to match a pattern image, the portion of the image data is replaced with the CG data identified by "CG004", and the image data resulting from replacing the portion is written to an internal destination in the digital camera.

As shown as one example in FIG. 6, the control information 143 is composed of an information attachment instruction and a recording instruction. The detailed information corresponding to the information attachment instruction includes the condition "pattern image match" and the attached information identifier "X001". The recording instruction designates the digital camera as the recording destination.

When the control information 143 is executed, attached information identified by the attached information identifier "X001" is attached to the image data obtained by photography by the digital camera, and the image data with the attached information attached thereto is written to an internal destination in the digital camera.

As shown as one example in FIG. 7, the control information 144 is composed of a frame delete instruction and a recording instruction. The detailed information corresponding to the frame delete instruction includes the condition "pattern image non-match". The recording instruction designates the digital camera as the recording destination.

When the control information 144 is executed, if a portion of any frame image among a plurality of frame images photographed by the digital camera matches the pattern image, the frame image that includes the matching portion is deleted, and the frame images remaining after the deletion are written to an internal destination in the digital camera.

As shown as one example in FIG. 8, the control information 145 is composed of a mosaic processing instruction, an image replacement instruction, a frame delete instruction, and a recording instruction. The detailed information corresponding to the mosaic processing instruction includes a condition "pattern image A match" and the mosaic block size "4". The detailed information corresponding to the image replacement instruction includes a condition "pattern image B match" and a replacement image identifier "G001". The detailed information corresponding to the frame delete instruction includes a condition "pattern image C". The recording instruction designates the digital camera as the recording destination.

When the control information 145 is executed, if a portion of any frame image among a plurality of frame images photographed by the digital camera is judged to match the pattern image A, the mosaic processing instruction with the block size "4" is executed with respect to the portion of the frame image. Next, if a portion of the frame image is judged to match the pattern image B, the portion is replaced with the replacement image identified by "G001". Then, if a portion of any frame image among the plurality of frame images is judged to match the pattern image C, then the corresponding frame image is deleted, and the remaining one or more frame images that on which the mosaic processing or the image replacement processing has been performed are written to the memory card.

Attached Information 151, 152, . . . .

In the same way as the pieces of control information, each piece of attached information is composed of a plurality of pieces of operation information, and each piece of operation information includes an execution number, and operation instruction, and detailed information.

Specifically, each piece of attached information is a computer program, and each piece of operation information is a computer instruction in a machine language format. The machine language format is a format that the digital cameras are capable of decoding and executing, and the pieces of control information are used by the digital cameras.

The pieces of attached information are executed when an image stored in the digital camera is copied to an external destination.

The pieces of operation information are identical to the operation information included in the control information, and therefore a description thereof is omitted here.

Examples of the operation instructions include a mosaic instruction, an image replacement instruction, and an encryption instruction.

(a) Mosaic Instruction

The mosaic instruction is as already described.

The detailed information corresponding to the mosaic instruction includes range information and a size.

The size is as already described.

The range information shows an area in an image to which mosaic processing is performed according to the mosaic instruction. This area is rectangular in shape. Here, an X-Y coordinate system such as the following is assumed in the image. With the top left point of the image as the origin, the top side of the image is the X coordinate axis and the left side of the image is the Y coordinate axis. The range information includes an X coordinate value X1 and a Y coordinate value Y1 of the top left point of the rectangle, and an X coordinate value X2 and a Y coordinate value Y2 of the bottom left point of the rectangle.

Range Information=((X1,Y1)-(X2,Y2))

As shown in FIG. 9, a specific example of the range information is:

((9999,9999)-(9999,9999)).

Here, each of the coordinate values in the range information shown in FIG. 9 being "9999" shows that the area in the image on which the mosaic processing is to be performed is undetermined. The area in the image on which the mosaic processing is to be performed is determined by performing matching using the pattern image, and detecting a partial image (i.e. a portion of the image data) that matches the pattern image.

(b) Image Replacement Instruction

The image replacement instruction is as already described.

The detailed information corresponding to the image replacement instruction includes, as one example, range information and a CG data identifier.

The CG identifier is identification information that identifies CG data.

The range information is as described earlier, and shows an area that is overwritten with the CG data shown by the CG data identifier.

As shown in FIG. 10, a specific example of the range information is:

((9999,9999)-(9999,9999)).

Here, each of the coordinate values in the range information shown in FIG. 10 being "9999" shows, as described earlier, that the area that is to be overwritten with the CG data is undetermined. In the same way as described above, the area in the image that is to be overwritten is determined by performing matching using the pattern image, and detecting a partial image that matches the pattern image.

(c) Encryption Instruction

The encryption instruction is an instruction that instructs that encryption processing determined according to an algorithm designated in the detailed information is to be performed on the compressed image data to which the attached information has been attached.

Here, the algorithm designation shows an encryption algorithm to be employed in encryption. One example of the encryption algorithm is a DES (Data Encryption Standard) algorithm.

Specific Example of Attached Information

As shown as one example in FIG. 9, the attached information 151 includes a mosaic instruction. The detailed information corresponding to the mosaic instruction includes range information ((9999, 9999)-(9999, 9999)) and a size "2". The attached information 151 is in a state in which it is stored in the server apparatus 100. When the attached information 151 is attached to compressed image data by the digital camera 200, the range information in the attached information 151 is overwritten as shown by attachment information 151*a* in FIG. 19. The detailed information in the attached information 151*a* includes range information ((010,010)-(020,020)).

When the attached information 151*a* is executed by the digital camera 200, if the compressed image data with the attached information attached thereto is copied, the compressed data is first expanded to generate image data, and then the mosaic processing instruction with the block size "2" is executed with respect to the rectangular area, in the generated image data, shown by the range information ((010,010)-(020, 020)) in the attached information 151*a*.

As shown as one example in FIG. 10, the attached information 152 includes an image replacement instruction and an encryption instruction. The detailed information corresponding to the image replacement instruction includes range information ((9999,9999)-(9999,9999)) and a CG identifier "CG005". The detailed information corresponding to the encryption instruction includes an algorithm "DES".

The attached information 152 is in a state in which it is stored in the server apparatus 100. When the attached information 152 is attached to compressed image data by the digital camera 200, the range information in the attached information 152 is overwritten as shown by attachment information 152a in FIG. 20. The detailed information in the attached information 152a includes range information ((020, 020)-(035,035)).

When the attached information 152a is executed by the digital camera 200, if the compressed image data with the attached information attached thereto is copied, the compressed data is first expanded to generate image data, and then CG processing that uses the CG data identified by the CG data identifier "CG005" is performed on the rectangular area, in the generated image data, shown by the range information ((020,020)-(035,035)) in the attached information 152a. Then, the image data on which the CG processing has been performed is compression encoded to generated compressed image data, and DES encryption is performed on the generated compressed image data, to generated encrypted compressed image data.

(2) Control Unit 101

The control unit 101 receives one user identifier, or one user identifier and one or more one tag identifiers, and also receives a request for control information, from the digital camera 200a via the wireless base station 31, the mobile telephone network 30, the Internet 20, and the transmission/reception unit 102.

When a User Identifier is Received

When one user identifier only is received, the control unit 101 attempts to read user information that includes the received user identifier, from the user information table 121 stored in the information storage table 103. If such user information does not exist in the user information table 121, the control unit 101 transmits non-existence information showing that a pattern image does not exist, to the digital camera 200a via the transmission/reception unit 102, the Internet 20 and the mobile telephone network 30.

If one or more pieces of such user information exist, the control unit 101 reads such user information from the user information table 121, temporarily stores the read user information, and extracts the pattern identifier from each of the one or more stored pieces of user information. In this way, one or more pattern image identifiers are extracted. Next, the control unit 101 reads each of the pattern images identified by the extracted one or more pattern image identifiers, and transmits the read one or more pattern images to the digital camera 200a via the transmission/reception unit 102, the Internet 20, and the mobile telephone network 30. In this way, one or more pattern images are transmitted.

When a User Identifier and at Least One Tag Identifier are Received

When a user identifier and one or more tag identifiers are received, the control unit 101 attempts to read user information that includes the received user identifier, from the user information table 121 stored in the information storage table 103. If such user information does not exist in the user information table 121, the control unit 101 transmits non-existence information showing that a pattern image does not exist, to the digital camera 200a via the transmission/reception unit 102, the Internet 20 and the mobile telephone network 30.

If one or more pieces of such user information exist, the control unit 101 reads all such user information from the user information table 121, temporarily stores the read user information, and attempts to extract user information that includes any of the one or more received tag identifiers, from among the read user information. Here, if such user information does not exist, the control unit 101 transmits non-existence information showing that a pattern image does not exist, to the digital camera 200a via the transmission/reception unit 102, the Internet 20 and the mobile telephone network 30.

If one or more pieces of user information that include any of the received tag identifiers exist, the control unit 101 temporarily stores the one or more pieces of user information, and then extracts the pattern image identifier from each of the one or more stored pieces of user information. In this way, one or more pattern image identifiers are extracted. Next, the control unit 101 reads all the pattern images identified by the extracted pattern identifiers from the information storage unit 103, and transmits the read pattern images to the digital camera 200a via the transmission/reception unit 102, the Internet 20 and the mobile telephone 30. In this way, one or more pattern images are transmitted.

When a Request for Control Information is Received

When a request for control information is received, the control unit 101 extracts the control information identifier included in each piece of user information temporarily stored as described above. If a piece of attached information is included in the temporarily stored pieces of user information, the control unit 101 also extracts each attached information identifier.

Next, the control unit 101 reads the pieces of control information identified by the extracted control information identifiers from the information storage unit 103, and transmits the read control information to the digital camera 200a via the transmission/reception unit 102, the Internet 20 and mobile telephone network 30. In this way, one or more pieces of control information are transmitted.

Furthermore, if an attached information identifier has been extracted, the control unit 101 reads the piece of attached information identified by the extracted attached information identifier from the information storage unit 103, and transmits the read piece of attached information to the digital camera 200a via the transmission/reception unit 102, the Internet 20 and the mobile telephone network 30. In this way, one piece of attached information is transmitted.

(3) Transmission/Reception Unit 102

The transmission/reception unit 102 is connected to the digital camera 200a via Internet 20 and the mobile telephone network 30, and performs transmission and reception of information between the digital camera 200a and the control unit 101.

1.3 Structure of Digital Cameras 200a, 200b, . . . .

The digital cameras 200a, 200b, . . . have the same structure as each other, and therefore are described as a single digital camera 200 in the following.

Figure 11:
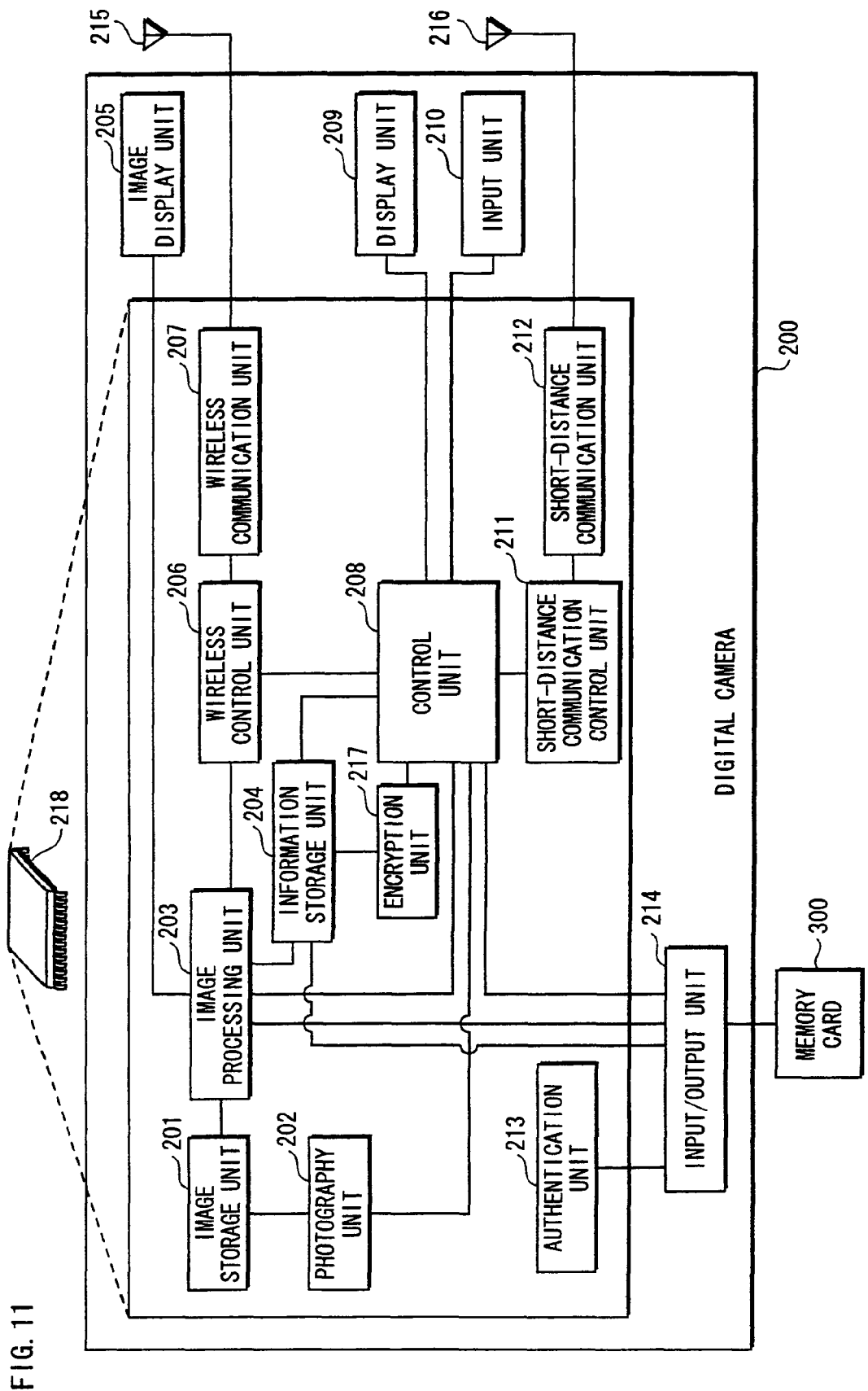
FIG. 11 is a block diagram showing the structure of a digital camera 200.

As shown in FIG. 11, the digital camera 200 is composed of an LSI (large scale integration) unit 218, an image display unit 205, a display unit 209, an input unit 210, an input/output unit 214, an antenna 215, and an antenna 216. The LSI unit 218 is composed of an image storage unit 201, a photography unit 202, an image processing unit 203, an information storage unit 204, a wireless control unit 206, a wireless communication unit 207, a control unit 208, a short-distance communication control unit 211, a short-distance communication unit 212, an authentication unit 213, and an encryption unit 217.

The LSI unit 218 is a super-multifunction LSI manufactured such that the described compositional units thereof are integrated on one chip. More specifically, the LSI unit 218 is a computer system composed of a microprocessor, a ROM, an RAM, and so on. Computer programs are stored in the RAM, and the LSI unit 218 achieves its functions by the microprocessor operating in accordance with the computer programs.

(1) Information Storage Unit 204

Figure 12:
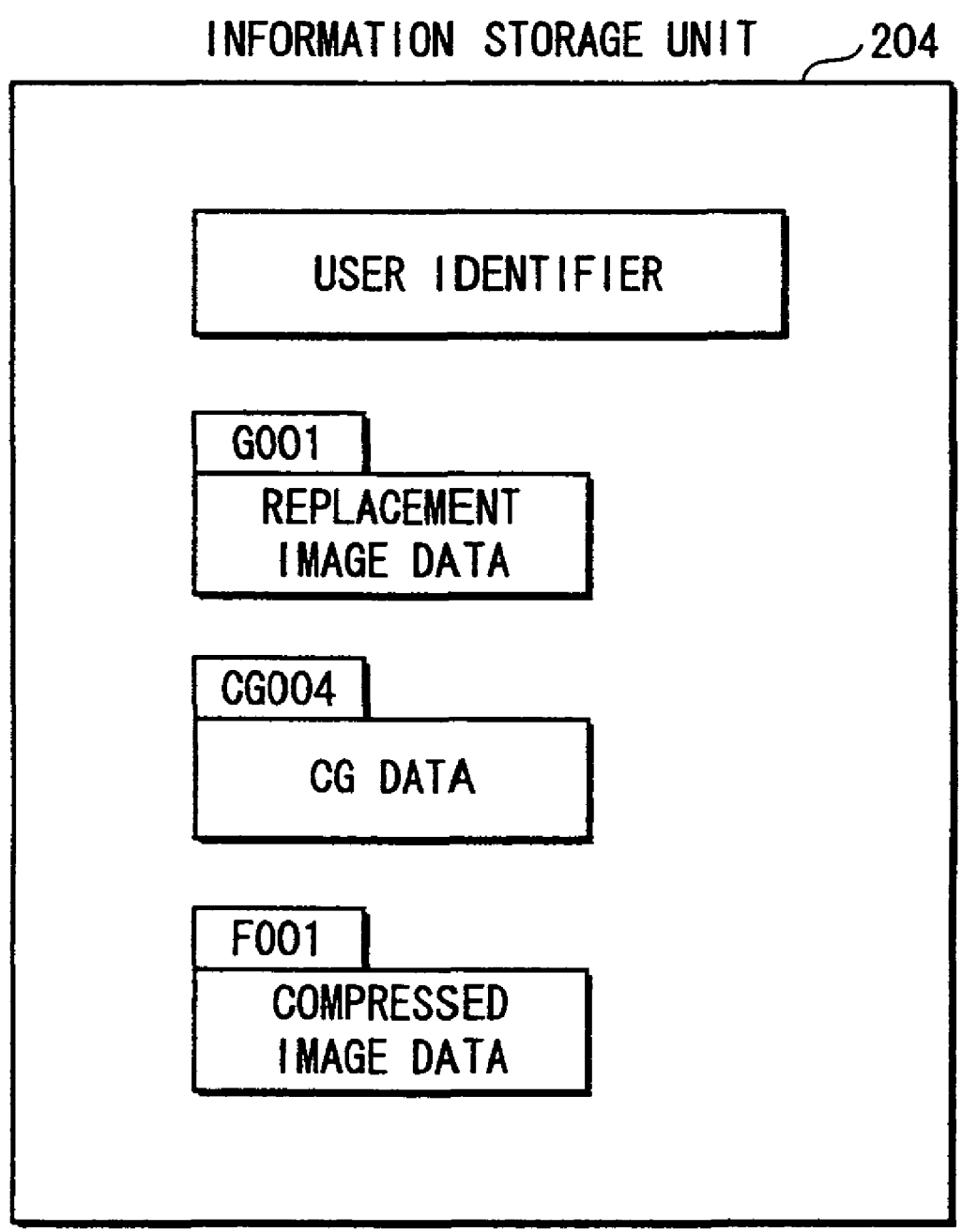
FIG. 12 shows an example of data stored in an information storage unit 204.

The information storage unit 204 has an area for storing information, and, as shown in FIG. 12, stores in advance a user identifier, replacement image data, and CG data. Other information such as compressed image data is written to the information storage unit 204.

The user identifier is identification information that identifies the user whose possesses the digital camera 200.

The replacement image data is compressed image data generated in accordance with the JPEG standard. A replacement image identifier that identifies the replacement image is attached to the replacement image data.

The CG data includes graphic rendition data that is detailed information necessary to render graphics. This detailed information includes the shape of a graphic image rendered on image data, coordinate data showing the position in the image data where the graphics are rendered, the size of the graphics, line segments that compose the graphics, color and thickness of curved lines, an instruction for hatching in a closed region, the pattern and color of the hatching, an instruction for filling in the closed region, and the pattern and color used to fill in the closed region. A CG data identifier that identifies the CG data is attached to the CG data.

(2) Wireless Control Unit 206, Wireless Communication Unit 207, and Antenna 215

The wireless control unit 207 amplifies a radio frequency signal received by the antenna 215, converts an output signal to an IF signal, and demodulates the amplified IF signal to a baseband signal. The wireless control unit 207 also modulates a high frequency signal using a baseband signal, converts the resultant output to a radio frequency, amplifies the radio frequency, and outputs the amplified radio frequency to the antenna 215. The wireless control unit 206 generates a baseband signal which it outputs to the wireless communication unit 207, and receives a baseband signal from the wireless communication unit 207.

In this way, the wireless control unit 206, the wireless communication unit 207, and the antenna 215 perform transmission and reception of information with the server apparatus 100 connected via the wireless base station 31, the mobile telephone network 30, and the Internet 20.

(3) Short-Distance Communication Control Unit 211, Short-Distance Communication Unit 212, and Antenna 216

The antenna 216, the short-distance communication unit 212, and the short-distance communication control unit 213 perform transmission and reception with the IC tag 400, by means of wireless communication using a frequency band of 2.4 GHz.

The short-distance communication unit 212 includes a transmission/reception unit that transmits and receives signals via the antenna 216, and a modulation/demodulation unit that modulates and demodulates signals. The short-distance communication control unit 211 processes various signals input/output to and from the short-distance communication unit 212. The short-distance communication control unit 211 also establishes a communication channel in short-distance communication, with a short-distance communication control unit 211 in the IC tag 400, and subsequently performs communication via the established communication channel.

In this way, in response to a read instruction from the control unit 208, the short-distance communication control unit 211, the short-distance communication unit 212, and the antenna 216 obtain a tag identifier from the IC tag 400, and output the obtained tag identifier to the control unit 208.

(4) Input/Output Unit 214

Under the control of the control unit 208, the input/output unit 214 writes information to the memory card 300, and reads information from the memory card 300.

(5) Authentication Unit 213

Before information is to be output to the memory card 300 or before information is to be read from the memory card 300, the authentication unit 213 performs mutual device authentication with the memory card 300. The authentication unit 213 permits the input/output unit 214 to perform subsequent input/output of information only if the mutual device authentication succeeds. If the mutual device authentication fails, the authentication unit 213 prohibits the input/output unit 214 from performing input/output of information with the memory card 300.

(6) Image Storage Unit 201

The image storage unit 201 has an area for storing information. The image storage unit 201 mainly stores image data generated by the photography unit 202, and image data that is a target of various processing by the image processing unit 203.

(7) Photography Unit 202

The photography unit 202 includes: a lens group that consists of a plurality of combined lenses; a lens control unit that brakes the distance between the lenses; an AF processing unit that measures the distance with an object, and, in accordance with the measured distance, instructs the distance to be between the lenses to the lens control unit; and a CCD that has a plurality of optical elements, and outputs electric signals that have been generated in accordance with light that has passed through the lens group and been received by the optical elements. In response to an instruction from the control unit 208, the photography unit 202 writes image data generated by performing photography, to the image storage unit 201.

(8) Image Display Unit 205, Display Unit 209, and Input Unit 210

Based on an instruction from the control unit 208, the image display unit 205 displays a reduced image generated by the image processing unit 203.

Based on an instruction from the control unit 208, the display unit 209 displays information such as conditions when photographing an object, and how many photos can still be taken.

The input unit 210 includes buttons such as a shutter button for instructing photography, and a copy button for instructing copying of compressed image data stored in the information storage unit 204. The input unit 210 outputs instruction information corresponding to a button that has been operated by the user, to the control unit 208. More specifically, when the user operates the shutter button, the input unit 210 outputs an instruction to photograph an object to the control unit 208. When the user operates the copy button, the input unit 210 outputs a data identifier that identifies compressed image data stored in the information storage unit 204 to the control unit 208. When the user operates another one of the buttons, the input unit 210 outputs a corresponding instruction to the control unit 208.

(9) Control Unit 208

The control unit 208 receives, from the input unit 210, any of: an object photography instruction; a data identifier that identifiers compressed image data stored in the information storage unit 204 and a copy instruction for copying the compressed image data; and another instruction.

Object Photography

On receiving an object photography instruction, the control unit 208 outputs a photography instruction for photographing an object to the photography unit 202, and outputs a read instruction for reading a tag identifier from an IC tag to the short-distance communication control unit 211. Next, the control unit 208 reads the user identifier from the information storage unit 204. If one or more tag identifiers have been read by means of the antenna 216, the short-distance communication unit 212, and the short-distance communication control unit 211, the control unit 208 receives the read one or more tag identifiers.

Next, the control unit 208 transmits the read one or more identifiers to the server apparatus 100 via the wireless control unit 206, the wireless communication unit 207, the antenna 215, the wireless base station 31, the mobile telephone network 30 and the Internet 20.

Note that hereinafter, the control unit 208 transmitting information to the server apparatus 100 via the wireless control unit 206, the wireless communication unit 207, the antenna 215, the wireless base station 31, the mobile telephone network 30 and the Internet 20 will simply be referred to as the control unit 208 transmitting information to the server apparatus 100 via the network. Similarly, the control unit 208 receiving information from the server apparatus 100 via the Internet 20, the mobile telephone network 30, the wireless base station 31, the antenna 215, the wireless communication unit 207, and the wireless control unit 206 will simply be referred to as the control unit 208 receiving information from the server apparatus 100 via the network.

Having received one or more tag identifiers, the control unit 208 transmits the received one or more tag identifiers to the server apparatus 100 via the network.

Next, the control unit 208 receives either non-existence information, or one or more pattern images from the server apparatus 100, and temporarily stores the received non-existence information or the received one or more pattern images internally.

In the case of receiving non-existence information, the control unit 208 outputs a compression encoding instruction instructing that image data obtained by photography by the photography unit 202 is to be compression encoded, to the image processing unit 203, and instructs the input/output unit 214 to write the generated compression encoded data to the memory card 300.

In the case of receiving one or more pattern images, and no non-existence information, the control unit 208 outputs, to the image processing unit 203, a matching instruction instructing that matching should be performed to determine whether or not a portion of the image data obtained by photography matches a received pattern image. The control unit 208 then receives a matching result from the image processing unit 203, showing whether or not a matching portion exists.

When the received matching result shows that a matching portion does not exist, the control unit 208 instructs the image processing unit 203 to compression encode the image data obtained by photography by the photography unit 202, and instructs the input/output unit 214 to write the generated compression encoded image data to the memory card 300.

If the received matching result shows that a matching portion exists, the control unit 208 transmits a request for control information to the server apparatus 100 via the network, and receives one piece of control information, or one piece of control information and one piece of attached information, from the server apparatus 100 via the network. The control unit 208 temporarily stores the received piece of control information, or the received piece of control information and the received piece of attached information, internally.

In the case of receiving the piece of control information, or the piece of control information and the piece of attached information, the control unit 208 reads the pieces of operation information included in the received piece of control information, in order of the execution numbers in the pieces of attached information. The control unit 208 analyzes each read piece of operation information to extract the operation instruction and the detailed information therefrom, and judges which of mosaic processing, image replacement, information attachment, frame deletion, and recording the extracted operation instruction indicates.

If the extracted operation instruction is judged to be any of mosaic processing, image replacement, and frame deletion, the control unit 208 outputs, to the image processing unit 203, the respective one of a mosaic processing instruction instructing mosaic processing, an image replacement instruction instructing image replacement, and a frame deletion instruction instructing frame deletion. Here, the control unit 208 also outputs the detailed information included in the extracted operation instruction to the image processing unit 203.

When it is judged that an information attachment instruction and a recording instruction exist in succession in the extracted operation instructions, or that an information attachment instruction and a recording instruction exist in the corresponding control information and that the extracted operation instruction is a recording instruction, the control unit 208 extracts the condition and attachment information identifier from the detailed information extracted in response to the information attachment instruction, and judges whether or not the situation at the present point in time matches the extracted condition.

As one specific example, the present point in time is the result of the described matching processing by the image processing unit 203. One specific example of the extracted condition is the condition "pattern image match" as shown in FIG. 6, and if the matching result received from the image processing unit 203 shows that a matching portion does not exist, the attachment of attached information to the compressed image data that is described below is not performed.

On the other hand, if the matching result received from the image processing unit 203 shows that a matching portion exists, the control unit 208 selects, from among the received attached information, the piece of attached information identified by the extracted attached information identifier, and reads the range information from the information storage unit 204. As is described later, this range information has been written to the information storage unit 204 by the image processing unit 203, and is coordinate information showing the position of a partial image, in the image generated by photographing, that matches the pattern image. Next, the control unit 208 overwrites the read range information with the range information in the detailed information in the selected attached information. Examples of attached information generated in this way are shown in FIG. 19 and FIG. 20. The attachment information 151*a* shown in FIG. 19 includes the range information ((010,010)-(020,020)).

This range information is coordinate information showing the position of a partial image, in the image generated by photographing, that matches the pattern image, and this range information indicates a rectangular area whose top left point is (010,010) and whose bottom right point is (020,020).

Similarly, the attachment information 152*a* shown in FIG. 20 includes the range information ((020,020)-(035,035)).

This range information is coordinate information showing the position of a partial image, in the image generated by photographing, that matches the pattern image, and this range information indicates a rectangular area whose top left point is (020,020) and whose bottom right point is (035,035).

Next, if the detailed information extracted in response to the recording instruction shows "memory card", the control unit 208 outputs a compression encoding instruction to the image processing unit 203, instructing that the image data stored in the image storage unit 201 is to be compression encoded. As a result, compressed image data is written to the information storage unit 204. The control unit 208 writes the attached information, whose range information has been overwritten, to the information storage unit 204 so as to attach the attached information to the written compressed image data. The control unit 208 also instructs the input/output unit 214 to write the stored compressed image data (with the attached information attached thereto) to the memory card 300.

If the detailed information extracted in response to the recording instruction shows "inside digital camera", the control unit 208 instructs the image processing unit 203 to compression encode the image data stored in the image storage unit 201, and write the generated compressed image data to the information storage unit 204. As a result, compressed image data is written to the information storage unit 204. The control unit 208 writes the selected attached information to the information storage unit 204 so as to attach the attached information to the written compressed image data.

When the extracted operation instruction is judged to be record, in other words, when an information attachment instruction does not exist before the operation instruction in the control information, if the extracted detailed information shows "memory card", the control unit 208 outputs a compression encoding instruction to the image processing unit 203, instructing that the image data stored in the image storage unit 201 is to be compression encoded, and instructs the input/output unit 214 to write the compressed image data stored in the information storage unit 204 to the memory card 300. If the extracted detailed information shows "inside digital camera", the control unit 208 instructs the image processing unit 203 to compression encode the image data stored in the image storage unit 201, and write the generated compressed image data to the information storage unit 204.

The control unit 208 reads each of the pieces of operation information in the piece of control information in accordance with the execution numbers in the pieces of operation information, and decodes and executes each read piece of operation information.

Image Copying

On receiving a data identifier that identifies compressed image data, and a copy instruction therefor, the control unit 208 reads the user identifier from the information storage unit 204. Next, the control unit 208 selects the compressed image data identified by the received data identifier, and extracts the attached information attached to the compressed image data.

The control unit 208 then decodes the extracted attached information, extracts the pieces of operation information therefrom, and further extracts the operation instructions and pieces of detailed information from the extracted pieces of operation information. The control unit 208 judges whether or not any of the extracted pieces of detailed information includes a condition of judging whether or not a pattern image matches.

If such a judgment is included as a condition in any of the extracted pieces of detailed information, the control unit 208 transmits the user identifier to the server apparatus 100 via the network. The control unit 208 then receives one of (a) non-existence information, and (b) one or more pattern images, from the server apparatus 100 via the network.

If non-existence information is not received, in other words, if one or more pattern images are received, the control unit 208 outputs a matching instruction to the image processing unit 203, for perform matching to determined whether or not a portion of any of the received image patterns exists in image data obtained by photography. The control unit 208 then receives a matching result showing whether or not a matching portion exists, from the image processing unit 203.

Next, the control unit 208 decodes the attachment information to extract the pieces of operation information, and decodes the extracted pieces of operation of information in accordance with the execution numbers included therein, to extract the operation instructions and pieces of detailed information. The control unit 208 judges whether each extracted operation instruction is any of mosaic processing, image replacement processing, and encryption.

Next, the control unit 208 outputs, to the image processing unit 203, the received data identifier and an expansion instruction instructing that the compressed image data identified by the data identifier is to be expanded. As a result, image data obtained by expanding the compressed image data is written to the image storage unit 201 by the image processing unit 203.

If an extracted operation instruction is judged to be either of mosaic processing and image replacement, the control unit 208 outputs, to the image processing unit 203, a corresponding one of a mosaic processing instruction instructing mosaic processing and an image replacement instruction instructing image replacement. Here, the control unit 208 also outputs the piece of detailed information included in the extracted operation instruction to the image processing unit 203. As a result, image data that has been subjected to mosaic processing and/or replacement processing is stored in the image storage unit 201.

Next, if encryption is not included in the extracted instructions, the control unit 208 outputs a compression encoding instruction instructing compression encoding of the image data stored in the image information storage unit 201, to the image processing unit 203, and instructs the input/output unit 214 to write the compressed image data stored in the information storage unit 204 to the memory card 300.

On the other hand, if encryption is included in the extracted instructions, the control unit 208 outputs compression encoding instruction that instructs compression encoding of the image data stored in the image storage unit 201, to the image processing unit 203. As a result, compressed image data is stored in the information storage unit 204. Next, the control unit 208 outputs the data identifier and an encryption instruction that indicates encryption, to the encryption unit 217. As a result, encrypted compressed image data is stored in the information storage unit 204. Next, the control unit 208 instructs the input/output unit 214 to write the encrypted compressed image data stored in the information storage unit 204 to the memory card 300.

Other Processing

On receiving any of other instructions, the control unit 208 performs processing corresponding to the received instruction.

(10) Image Processing Unit 203

The image processing unit 203 receives any of a compression encoding instruction, an expansion instruction, a matching instruction, a mosaic processing instruction, an image replacement instruction, and a frame delete instruction from the control unit 208. Together with the instruction, the image processing unit 203 also receives detailed information from the control unit 208. There are cases in which the image processing unit 203 also receives from the control unit 208 a data identifier identifying compressed image data, and a method identifier indicating a compression encoding method.

Compression Encoding

On receiving a compression encoding instruction, the image processing unit 203 performs compression encoding in accordance with a designated compression encoding method on the image data stored in the image storage unit 201, thereby generating compressed image data, and writes the generated compressed image data to the information storage unit 204. Here, the designated compression encoding method may, for instance, conform to JPEG or MPEG 4.

The compression encoding method is designated according to an instruction from the user prior to photographing an object. JPEG is designated if the user instructs still image photography, and MPEG 4 is designated if the user instructs moving image photography.

Expansion of Compressed Image Data

On receiving an expansion instruction, the image processing unit 203 receives a data identifier identifying the compressed image data, from the control unit 208. Next, the image processing unit 203 reads, from the information storage unit 204, the compressed image data identified by the received data identifier, and analyzes the header of the read compressed image data to obtain the method identifier indicating the compression encoding method that was used when the compression encoded data was generated.

Next, based on the expansion method identified by the obtained identifier, the image processing unit 203 performs expansion decoding on the read compressed image data, to generate image data, and writes the generated image data to the image storage unit 201.

Matching

On receiving a matching instruction, the image processing unit 203 further receives a pattern image from the control unit 208, and performs matching to determine whether or not a portion that matches the received pattern image exists in the image data stored in the image storage unit 201. The image processing unit 203 then temporarily stores therein a matching result showing whether or not a matching portion exists, and outputs the matching result to the control unit 208.

The image processing unit 203 performs matching in the following way.

(Step a) In the following "S" represents the image data stored in the image storage unit 201. The image processing unit 203 selects a partial image of the image data S (in other words, selects a portion of the image data S) that is the same size as the pattern image. Here, the image processing unit 203 selects the partial image such that the top left point of the partial image matches the top left point of the image data.

In the following, "P" represents the pattern image, and "P[i]" represents a value of a pixel in the pattern image P. Here, "i" is information showing the location of the pixel in the pattern image P, and $1 \leq i \leq n$, "n" being the number of pixels in the pattern image P.

Furthermore, "B(j)" represents the partial image, and "B(j)[i]" represents a value of a pixel in the partial image B(j). Here, "j" is information showing the location of the pixel in the partial image B (j), and $1 \leq j \leq m$, "i" being information showing the location of the pixel in the partial image B(j).

When the partial image is selected such that the top left point of the partial image and the top left point of the image data match as described above, j=1, and the partial image selected in this way is B(1).

(Step b) The image processing unit 203 obtains, with respect to each pixel in the pattern image P, an absolute value that is a difference between the pixel and a pixel in a corresponding location in the partial image B(j), and then calculates a total Sum(j) of the absolute values.

$$\text{Sum}(j) = \sum_{i=1}^{n} |P[i] - B(j)[i]|$$

Here, $\Sigma$ is the sum of the possible values of "i" ($1 \leq i \leq n$).

(Step c) The image processing unit 203 judges whether or not the selected partial image meets the following condition.

Condition: The bottom right point of the selected partial image matches the bottom right point of the image data S.

If the condition is met, the image processing unit 203 proceeds to Step e.

If the condition is not met, the image processing unit 203 proceeds to Step d.

(Step d) The image processing unit 203 shifts the partial image one pixel to the right, or one pixel down, in the image data S, thereby selecting a new partial image.

Here, "j" is incremented by one.

$j=j+1$

Next, the image processing unit 203 proceeds to Step b.

(Step e)

The image processing unit 203 selects a total Sum(x) that is no greater than a predetermined threshold value, from among totals Sum(1), Sum(2), . . . Sum(m). Here, the threshold value is a relatively small value close to zero.

Sum (x)≦Threshold Value

Since it can be assumed that the partial image at the location shown by the obtained "x" matches the pattern image, the image processing unit 203 temporarily stores location information x that shows the location of the partial image that matches the pattern image.

If a total no greater than the threshold value does not exist among the calculated totals Sum(1), Sum(2), . . . Sum(m), the image processing unit 203 judges that a partial image matching the pattern image does not exist.

Finally, if the image processing unit 203 has been able to obtain a partial image matching the pattern image, the image the image processing unit 203 generates an X coordinate value X1 and a Y coordinate value Y1 of the top left point of the partial image in the image data, and an X coordinate value X2 and a Y coordinate value Y2 of the bottom right point of the partial image in the image data. The X coordinate value X1 and the Y coordinate value Y1 of the top left point and the X coordinate value X2 and the Y coordinate value Y2 of the bottom right point make up the range information.

Range information=((X1,Y1)-(X2,Y2))

The image processing unit 203 then writes the range information to the information storage unit 204.

Mosaic Processing

On receiving a mosaic processing instruction, the image processing unit 203 further receives detailed information, and extracts the condition and size from the received detailed information. Note that the condition and size are as described earlier.

The image processing unit 203 judges whether the situation at the present point in time meets the extracted condition, and if so (i.e., the present point in time meets the extracted condition), then the image processing unit 203 performs the below-described mosaic processing using the extracted size. If the condition is not met, the image processing apparatus 203 does not perform the mosaic processing.

One example of the condition is a match with the pattern image, and in the case of this example of the condition, if the matching result temporarily stored by the image processing unit 203 is that a matching portion exists, the condition is met.

Conversely, if the matching result is that a matching portion does not exist, the condition is not met.

The image processing apparatus 203 performs mosaic processing in the following way.

The image processing unit 203 divides the partial image shown by the location information x that shows the location of the partial image that matches the pattern image, into a plurality of rectangular (square) block areas. Then, for each block area, the image processing unit 203 selects one pixel in the block area, and writes back the pixel block using the pixel value of the selected pixel as the pixel value of all the other pixels in the block area.

Image Replacement

On receiving an image replacement instruction, the image processing unit 203 further receives detailed information, and extracts the condition and the replacement image identifier, or the condition and the CG data identifier, from the received detailed information. Note that the condition, replacement image identifier, and CG data identifier are as described earlier.

Next, the image processing unit 203 judges whether the situation at the present point in time meets the extracted condition, and if so (i.e., the present point in time meets the extracted condition), then the image processing unit 203 performs the below-described image replacement processing using the extracted size. If the condition is not met, the image processing apparatus 203 does not perform the image replacement processing.

The image processing unit 203 performs image replacement processing in the following way.

The image processing unit 203 reads either the replacement image data identified by the replacement image identifier extracted from the information storage unit 204, or the CG data identified by the CG data identifier extracted from the information storage unit 204. Next, the image processing unit 203 either replaces the partial image shown by the location information x that shows the location of the partial image that matches the pattern image, with the replacement image data, or renders a graphic image based on the read CG data on the partial image shown by the location information x.

Frame Deletion

On receiving a frame deletion instruction, the image processing unit 203 further receives detailed information, and extracts the condition from the received detailed information. Note that the condition is as described earlier.

Next, the image processing unit 203 judges whether the situation at the present point in time meets the extracted condition, and if so, deletes the frame image the meets the condition. If the extracted condition is not met, the image processing unit 203 does not perform frame deletion.

(11) Encryption Processing Unit 217

The encryption processing unit 217 receives, from the control unit 208, a data identifier that identifies a target of encryption, and an encryption instruction that indicates encryption.

On receiving the encryption instruction, the encryption processing unit 217 reads, from the information storage unit 204, the compressed image data identified by the data identifier, performs an encryption algorithm on the read compressed image data, thereby generating encrypted compressed image data, and writes the generated encrypted compressed image data to the information storage unit 204.

Here, one example of the encryption algorithm is a DES algorithm.

1.4 Structure of Memory Card 300

Figure 13:
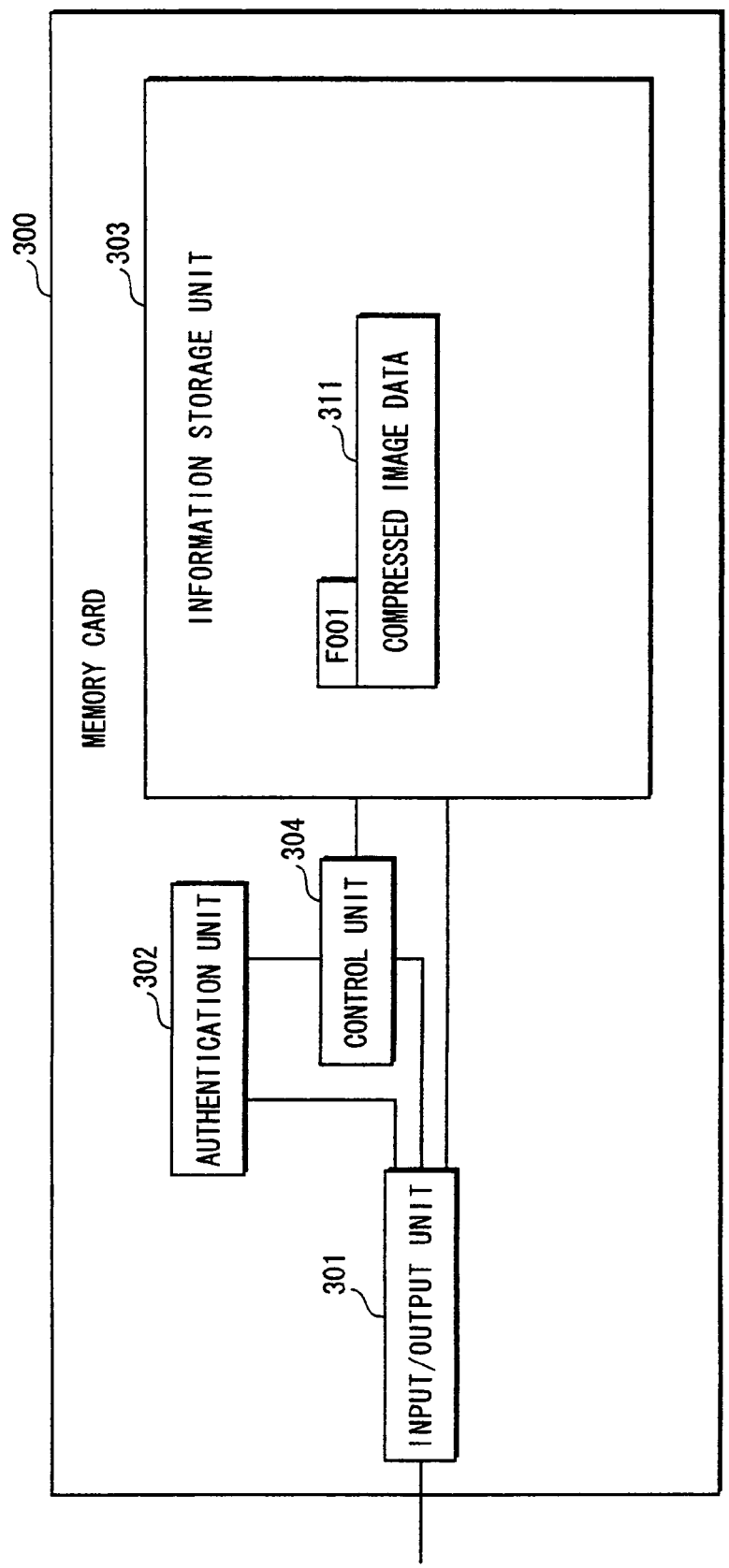
FIG. 13 is a block diagram showing the structure of a memory card 300.

As shown in FIG. 13, the memory card 300 includes an input/output unit 301, an authentication unit 302, an information storage unit 303, and a control unit 304.

(1) Control Unit 304

Specifically, the control unit 304 is composed of a microprocessor, a ROM, a RAM, and so on, and computer programs are stored in the ROM. The control unit 304 achieves its functions by the microprocessor operating in accordance with the computer programs.

(2) Information Storage Unit 303

The information storage unit 303 is a large-capacity flash memory. As shown in FIG. 13, as one example, the information storage unit 303 stores compressed image data 311. The compressed image data 311 is identified by a data identifier "F001".

(3) Authentication Unit 302

On the memory card 300 being loaded in the digital camera 200, the authentication unit 302 performs challenge-response mutual device authentication with the authentication unit 213 of the digital camera 200.

More specifically, the authentication unit 302 receives authentication by the authentication unit 213, and then the performs authentication of the authentication unit 213.

When both authentications succeed, the authentication unit 302 permits the input/output unit 301 to output information to the digital camera 200 and to receive information from the digital camera 200. When both authentications fail, the authentication unit 302 prohibits the input/output unit 301 from performing data input/output.

(4) Input/Output Unit 301

On the memory card 300 being loaded in the digital camera 200, the input/output unit 301 performs input/output of information with the digital camera 200.

1.5 Structure of the IC Tag 400

Figure 14:
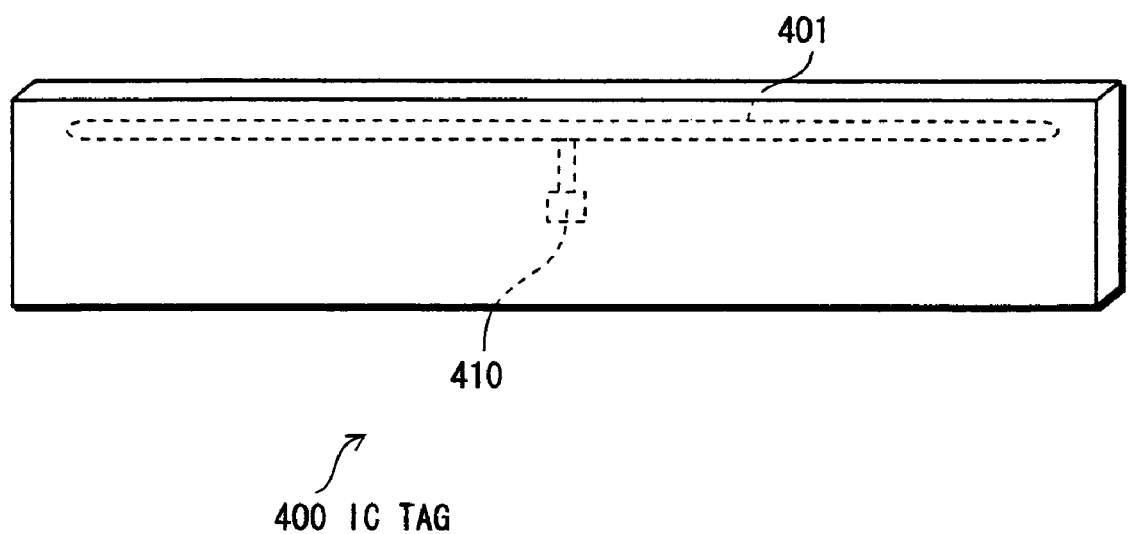
FIG. 14 is an external view of an IC tag 400.

As shown in FIG. 14, the IC tag is resin that has been formed into a "plate" shape that is 30 mm in length, 5 mm in width, and 0.5 mm in thickness, and in which an IC chip unit 410 and an antenna unit 401 have been inserted.

Note that a method used to form a wireless IC tag is set forth in Japanese Patent Application Publication No. H8-276458, and therefore a detailed description is omitted here.

The IC tag 400 is capable of communicating within a distance of approximately 1 meter, and has a communication speed of 1 Mbps.

Figure 15:
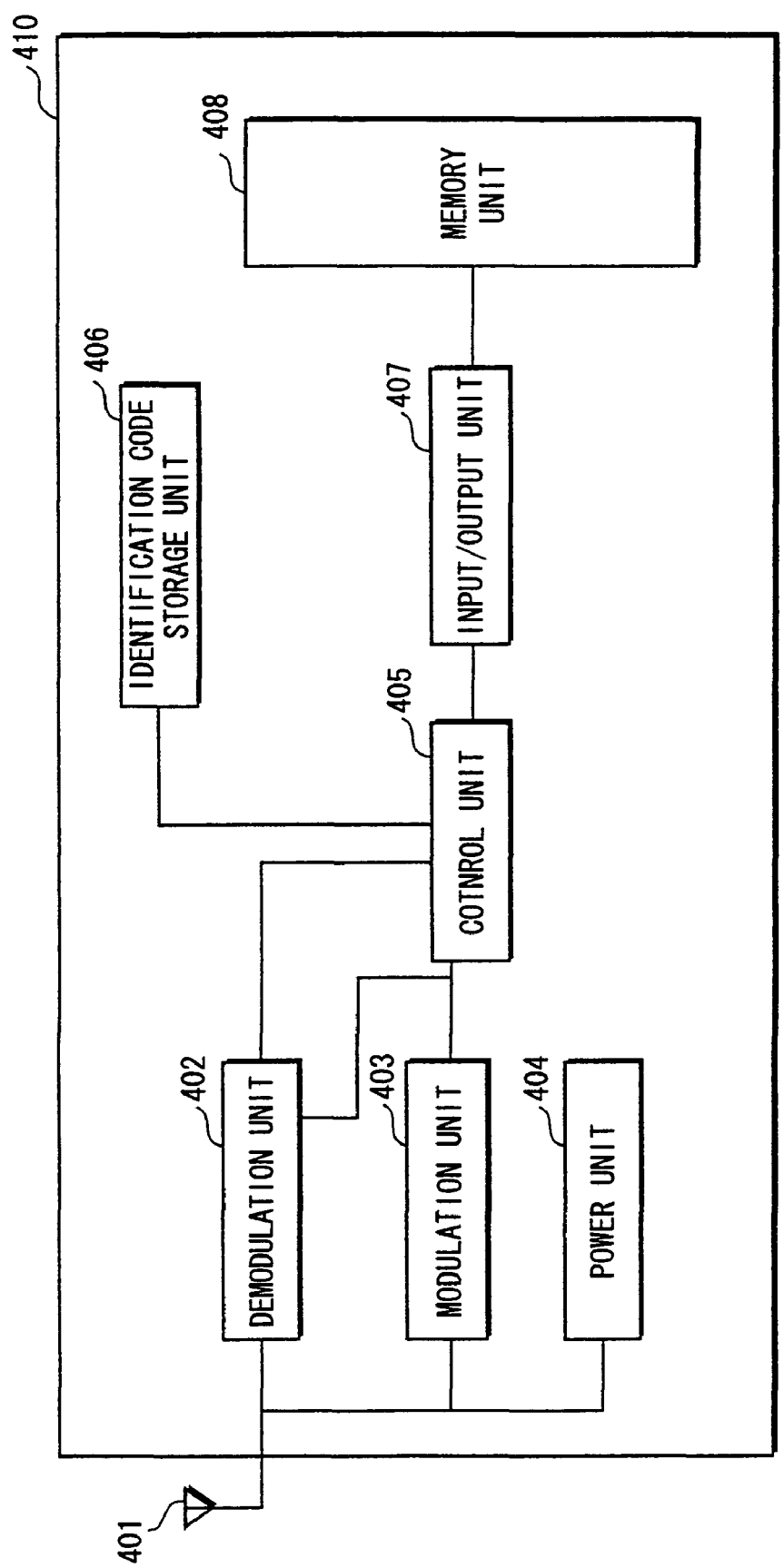
FIG. 15 is a block diagram showing the structure of an IC chip unit 410 in the IC tag 400.

As shown in FIG. 15, the IC chip unit 410 includes a demodulation unit 402, a modulation unit 403, a power unit 404, a control unit 405, an identification code storage unit 406, an input/output unit 407, and a memory unit 408.

In terms of dimensions, the IC chip unit 410 is 1 mm in height, 1 mm in width, and 0.25 microns in thickness.

(1) Identification Code Storage Unit 406

The identification code storage unit 406 stores an identification code that uniquely identifies the IC tag 400. The identification code is a 32-bit code that is made up of: a manufacturer identification code that identifies the manufacturer of the wireless IC tag (10 bits); a type code that identifies the specifications, type and so on of the wireless IC tag in the case that the wireless IC tag conforms to a plurality of specifications, types and so on (10 bits); and a manufacturing number that is a value set uniquely by manufacturer and type (12 bits).

(2) Memory Unit 408

The memory unit 408 is an EEprom (electronically erasable and programmable read only memory) that has a 1-Kbyte storage capacity.

Note that a fuse ROM may be used instead of an EEprom. A fuse ROM is a type of memory from which data is unable to be deleted once written thereto. Using a fuse ROM prevents the data being tampered with. Alternatively, both an EEprom and a fuse ROM may be used.

The memory unit 408 stores information such as information regarding the product to which the IC tag is attached. Examples of such information are the manufacturer name, a manufacturing number, and a manufacturing date of the product.

(3) Power Unit 404

The power unit 404, which is connected to the antenna unit 401, receives an electric signal from the antenna unit 401, and stores the received electric signal as electric charge. The power unit 404 also supplies power to the compositional units of the IC tag 400.

Figure 16:
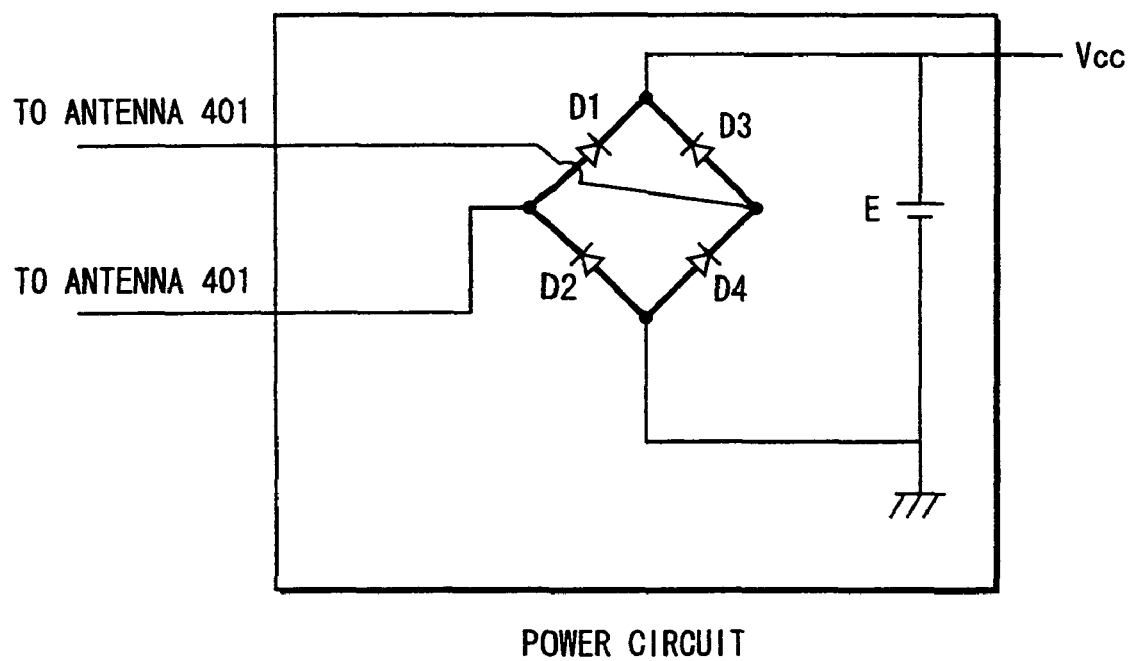
FIG. 16 shows an example of a power circuit in a power unit 404 in the IC tag 400.

One example of a power circuit in the power unit 404 is shown in FIG. 16. The power circuit shown in FIG. 16 is composed of four diodes D1 to D4, and a battery E. The diodes D1 and D2 are connected in series in a same direction, and the diodes D3 and D4 are connected in series in a same direction. Furthermore, the diodes D1 and D2 are connected in parallel in the same direction as the diodes D3 and D4. One end of the antenna unit 401 is connected to a midpoint between the diodes D1 and D2, and the other end of the antenna unit 401 is connected to a midpoint between the diodes D3 and D4. One end of the battery E is connected to a midpoint between the diodes D1 and D3, and the other end of the battery E is connected to a midpoint between the diodes D2 and D4.

(4) Demodulation Unit 402

The demodulation unit 402 receives a power signal from the antenna unit 401, selects a frequency of 2.45 GHz from the received power signal, extracts a pulse signal wave from the selected signal, and outputs the extracted pulse signal wave from the control unit 405.

(5) Control Unit 405

The control unit 405 receives a pulse signal wave from the demodulation unit 402, and deciphers the received pulse signal wave to extract instructions and operands. An identification code request instruction requesting an identification code is included in the instructions.

On receiving the identification code request instruction, the control unit 405 reads the identification code from the identification code storage unit 406, and outputs the read identification code to the modulation unit 403.

(6) Modulation Unit 403

The modulation unit 403 receives the identification code from the control unit 405, and switches the impedance of the antenna unit 401 in accordance with the bits (0 or 1) included in the bit series that makes up the received identification code. More specifically, the modulation unit 403 sets the impedance to a first value if each bit is "1", and sets the impedance to a second value if each bit is "0". This changes the amplitude and phase of the radio wave reemitted by the antenna unit 401, and due to the amplitude and phase being changed, information can be transmitted.

(7) Input/Output Unit 407

The input/output unit 407 writes information to the memory unit 408 and reads information from the memory unit 408, under the control of the control unit 405.

(8) Antenna Unit 401

The antenna unit 401, which is a reception antenna, receives a radio wave, converts the received radio wave to a power signal, and outputs the power signal to the demodulation unit 402 and the power unit 404. The antenna unit 401 has two types of impedance that can be switched between, the switching being performed by the modulation unit 403 as described earlier.

1.6 Operations by the Image Processing System 10

The following describes operations by the image processing system 10, and in particular, operations when photographing an object, and operations when copying generated compressed image data.

Figure 17:
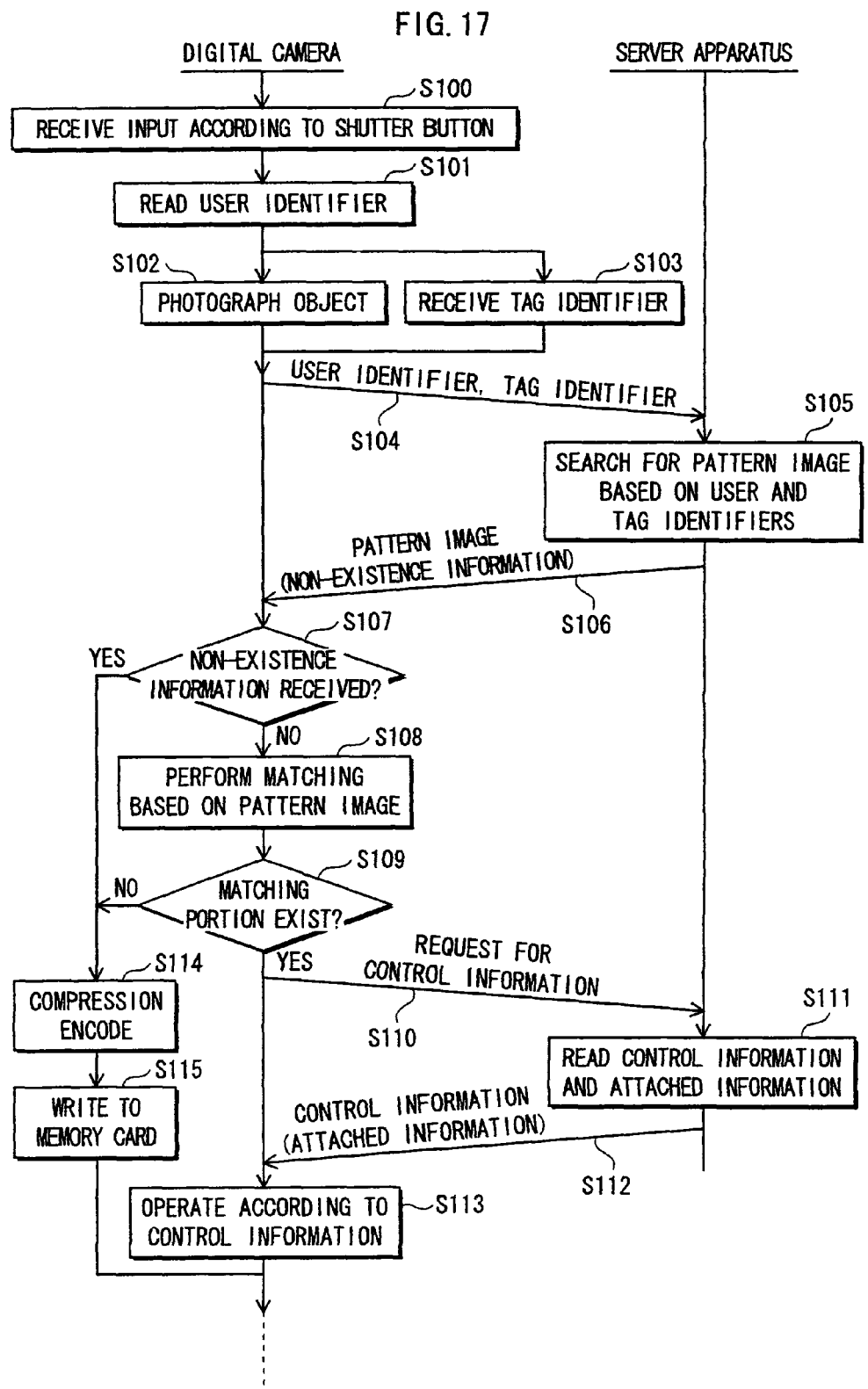
FIG. 17 is a flowchart showing operations by the image processing system 10 when photographing an object.

(1) The following describes operations by the image processing system 10 when photographing an object, with reference to the flowchart shown in FIG. 17.

On the shutter button being pressed by the user, the control unit 208 receives a photography instruction to photograph the object from the input unit 210 (step S100), and reads the user identifier from the information storage unit 204 (step S101). Next, the photography unit 202 photographs the object (step S102), and the antenna 216, the short-distance communication unit 212 and the short-distance communication control unit 211 obtain a tag identifier from an IC tag (step S103).

Next, the control unit 208 transmits the read user identifier and, in the case of a tag identifier being obtained, transmits the obtained tag identifier to the server apparatus 100 via the network (step S104). The control unit 101 reads the pattern image corresponding to the received user identifier and tag identifier from the information storage unit 103, and if a corresponding pattern image does not exist, generates non-existence information (step S105). The control unit 208 transmits the read pattern image or the non-existence information to the digital camera 200 via the network (step S106).

In the case of receiving non-existence information (step S107), the control unit 208 outputs, to the image processing unit 203, a compression encoding instruction that instructs compression encoding of the image data obtained by photography by the photography unit 202, and the image processing unit 203 writes the compressed image data to the information storage unit 204 (step S114). The control unit 208 instructs the input/output unit 214 to write the generated compressed image data to the memory card 300, and the input/output unit 214 reads the compressed image data from the information storage unit 204, and writes the read compressed image data to the memory card 300 (step S115). This ends the processing.

In the case of receiving the pattern image, and no non-existence information (step S107), the control unit 208 outputs, to the image processing unit 203, a matching instruction instructing performing of matching to determine whether or not a portion of the image data obtained by photography matches the received pattern image. The image processing unit 203 performs matching processing, and the control unit 208 receives a matching result showing whether or not a matching portion exists, from the image processing unit 203 (step S108).

When the received matching result shows that a matching portion does not exist (step S109), the image processing unit 203 generates compressed image data (step S114), and the input/output unit 214 writes the compressed data to a memory card 300 (step S115). This ends the processing.

When the received result shows that a matching portion exists (step S109), the control unit 208 transmits a request for control information to the server 100 via the network (step S110). The control unit 110 then reads the corresponding piece of control information from the information storage unit 103, reads the corresponding piece of attached information, if such attached information exists (step S111), and transmits the read piece of control information, or the read piece of control information and the read piece of attached information, to the digital camera 200 via the network (step S112).

The control unit 208 reads, decodes and executes the pieces of operation information included in the received piece of control information, in order in accordance with the execution numbers included in the pieces of operation information. In this way, mosaic processing, image replacement, information attachment, frame deletion, recording or the like included in the read pieces of operation information is executed (step S113). This ends the processing.

Figure 18:
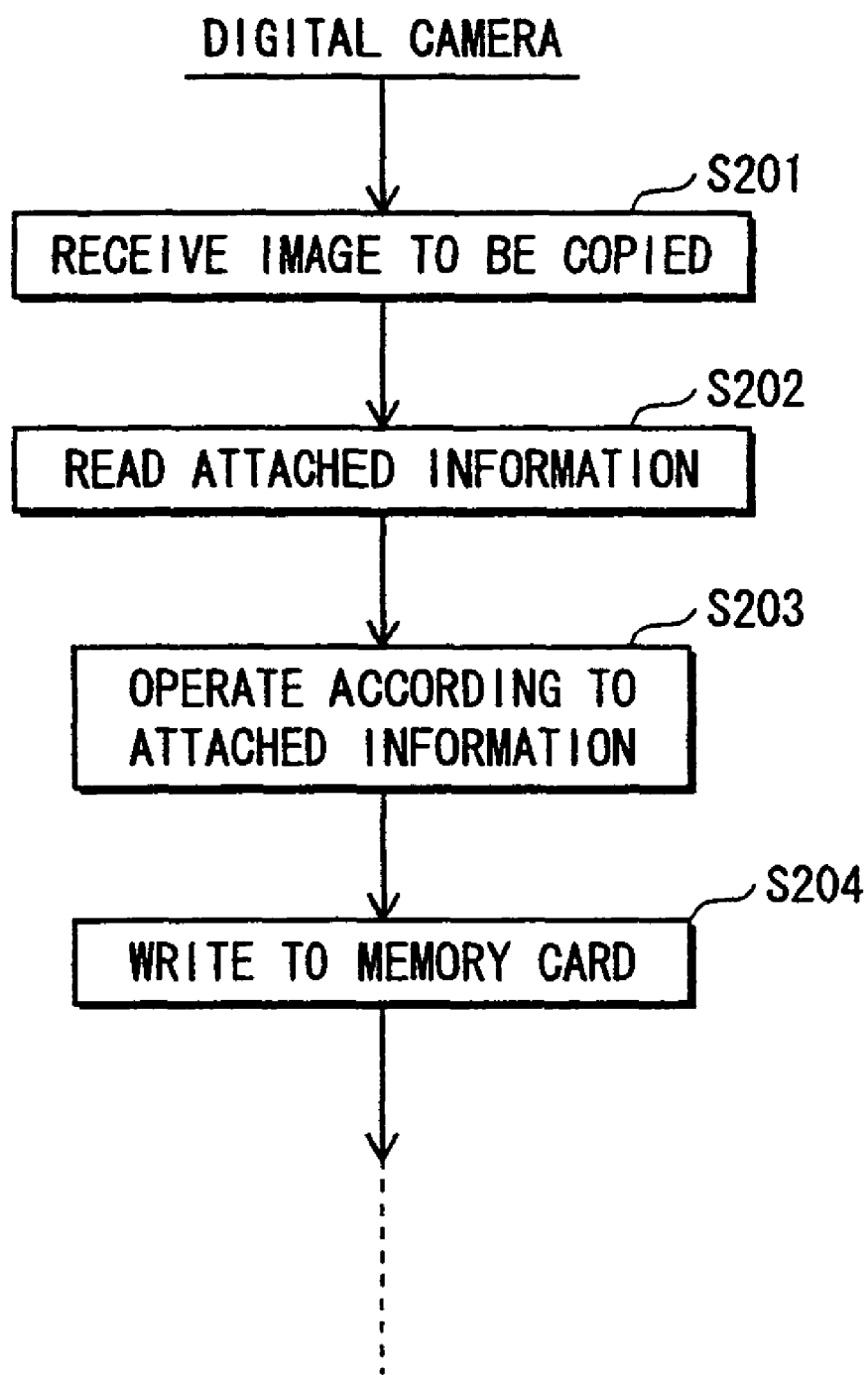
FIG. 18 is a flowchart showing operations by the image processing system 10 when copying generated compressed image data.

(2) The following describes operations by the image processing system 10 when copying generated compressed image data, with reference to the flowchart shown in FIG. 18.

When the copy button for instructing copying of compressed image data is pressed by the user, the control unit 208 receives, from the input unit 210, a data identifier identifying compressed image data (step S201), reads the compressed image data identified by the data identifier designated from the information storage unit 204 (step S202), and operates in accordance with the attached information included in the read compressed image data (step S203). The input/output unit 214 writes the compressed image data to the memory card 300 (step S204). This ends the processing.

1.7 Conclusion

As has been described, the image processing system is composed of a server apparatus and a plurality of digital cameras.

The server apparatus stores therein pattern images, control information and attached information in correspondence with user identifiers and tag identifiers. Each user identifier is information identifying a user of a digital camera, and each tag identifier is a unique identification number of an IC tag that stores the identification number and is attached to a subject. Each pattern image is an image that is used for comparison, and the pieces of control information and the pieces of attached information include operation instructions for various types of image processing.

A digital camera photographs a subject in response to an operation by the user, and at this time, if the subject has an IC tag attached thereto, the digital camera obtains a tag identifier from the IC tag. The digital camera then obtains a pattern image, a piece of control information and a piece of attached information from the server apparatus. The received pattern image, piece of control information and piece of attached information correspond to the user identifier and the tag identifier.

The digital camera judges whether or not a portion of the image data generated by photography exists that matches the obtained pattern image, an if such a matching portion exists, the digital camera operates in accordance with an operation instruction in the piece of control information. If the operation instruction indicates mosaic processing, the digital camera performs mosaic processing on the matching portion. If the operation instruction indicates image replacement, the digital camera replaces the matching portion with a predetermined image, or performs CG processing on the matching portion. If the operation instruction indicates frame deletion, the digital camera deletes the image data. In this way, the digital camera writes the image data to which image processing has been performed on an internal destination in the digital camera or to a memory card. Furthermore, if the operation instruction indicates information attachment, the digital camera attaches attached information to the image data. When the image data that has the attached information attached thereto is copied to an external destination outside the digital camera, image processing is performed on the image data in accordance with the attached information.

In this way, a pre-registered object is recognized in photographed video or images, and predetermined processing is performed with respect to the object. The predetermined processing is, for instance, mosaic processing, image replacement, or frame deletion. This prevents unauthorized photography of specific structures, people and the like, and protects security, privacy, portrait rights, and the like.

Furthermore, when photographing an object by continuous shooting or consecutive shooting, or taking moving images, there are cases when the subject is out of shot. In such a case, by judging whether or not the pattern image is included in video or images taken, processing for the image stream as a whole can be determined. If, for instance, the portion corresponding to the pattern image is out of shot or blurry, no portion will match the pattern image, and therefore the frame image will be deleted. Furthermore, it is possible to leave the frame images in which the object appears, as well as several preceding and proceeding frame images, and delete the other frame images. This makes subsequent organization of photographed images easier.

1.8 Modifications

Although the present invention has been described based on the above preferred embodiment, the present invention is by no means limited to the preferred embodiment. Cases such as the following are included in the present invention.

(1) In the above preferred embodiment, the digital camera transmits a user identifier, or a user identifier and a tag identifier, to the server apparatus, and the server apparatus receives the user identifier, or the user identifier and the tag identifier, extracts a corresponding pattern image, piece of control information, and piece of attached information with use of the received user identifier, or the received user identifier and tag identifier, and transmits the extracted pattern image, piece of control information and piece of attached information to the digital camera. However, the present invention is not limited to this structure.

For instance, the digital camera may send a request for the pattern image, control information and attached information to the server apparatus, and the server apparatus may transmit all the pattern images, control information and attached information that it stores.

Furthermore, the server apparatus may store a pattern image, control information and attached information in correspondence with an apparatus identifier of the digital camera, and the digital camera may transmit the apparatus identifier to the server apparatus. The server apparatus then extracts the pattern image, the control information and the attached information corresponding to the apparatus identifier, and transmits the extracted pattern image, control information and attached information to the digital camera.

(2) In the above preferred embodiment, matching based on a pattern image (hereinafter, such operations are referred to as "image referencing") and operations such as mosaic processing, image replacement, frame deletion, encryption or the like (hereinafter such operations are referred to as "mosaic processing etc.") in accordance with control are performed at the time of photography. However, image referencing and mosaic processing etc. are not limited to being performed at the time of photography.

The digital camera may internally store the image data generated by the photography, or compressed image data generated by compression encoding the image data, without performing image referencing and mosaic processing etc. at the time of photography. When a request is received to output the image data or the compressed image data, the digital camera may perform communication with the server apparatus to obtain a pattern image and control information, and perform image referencing and mosaic processing etc.

Alternatively, the digital camera may internally store the image data generated by the photography, or compressed image data generated by compression encoding the image data, without performing image referencing and mosaic processing etc. at the time of photography, and may include a location detection unit that uses GPS (global positioning system). Using the location detection unit, the digital camera may obtain its own present location, and using the obtained present location, judge whether it is located in a predetermined domain. If the digital camera judges that it has been taken outside the domain, the digital camera may perform communication with the server apparatus to obtain a pattern image and control information, and perform image referencing and mosaic processing etc.

This means that if a person registered as a target of mosaic processing etc. is photographed, the image of the person can be viewed as is, without being subjected to mosaic processing etc., within the domain, and subjected to mosaic processing etc. if the digital camera is taken outside the domain.

(3) The server apparatus may store, in advance, timing information showing when image referencing and mosaic processing etc. are to be performed, and when a user identifier is transmitted from the digital camera, the server apparatus may transmit the stored timing information to the digital camera. The digital camera may receive the timing information, and perform image referencing and mosaic processing etc. in accordance with the received timing information.

Here, as one example, the timing information may indicate that image referencing and mosaic processing etc. are to be performed at the time of photography. As another example, the timing information may indicate that image referencing and mosaic processing etc. are to be performed when image data generated by photography is output to a destination outside the digital camera. As yet another example, the timing information may indicate that image referencing and mosaic processing etc. are to be performed when the digital camera is taken outside a predetermined range.

(4) The target of image referencing and mosaic processing etc. is not limited to being image data currently being taken by the digital camera, but may be image data previously taken and stored. In this case, the digital camera transmits image data generated according to photography to a storage server apparatus, and the storage server apparatus performs image referencing and mosaic processing etc. with respect to the stored image data in the same way is the digital camera in the above preferred embodiment. Here, before performing image referencing and mosaic processing etc., the storage server apparatus may perform communication with the server apparatus 100 to obtain a pattern image and control information. Furthermore, the storage server apparatus may have a similar structure to the server apparatus 100, and obtain the pattern image and control information from a location in the storage server apparatus itself.

Portrait rights of registered people and the like can be protected if image data stored in the server apparatus is subjected to image referencing and mosaic processing etc. after photography in this way.

Furthermore, in this case, if a pattern image is registered in the server apparatus after the image data is stored in the server apparatus, image referencing and mosaic processing etc. can be performed on the image data already stored before the pattern image was registered. In this way, the portrait rights of people and the like registered as pattern images can be protected.

(5) When performing image referencing and mosaic processing etc. on generated image data or stored image data, in addition to generating image data on which mosaic processing etc. has been performed, encryption processing using an encryption key may be performed on the original image data to generate encrypted image data, which is then stored. Only a party that has the encryption key is able to use a decryption apparatus to decrypt the encrypted image data using the encryption key, and obtain the image data.

With this kind of structure, people who can restore the original image data are restricted only to people who have the encryption key.

Here, it is possible to have a structure whereby the generated encrypted image data is stored only inside the digital camera. Alternatively, the encrypted image data may be written to the memory card in response to a user request, together with the image data on which image processing has been performed.

Furthermore, the image data on which image processing has been performed and the generated encrypted data may be incorporated into one file, and the generated file written to the memory card.

Furthermore, it is possible to perform encryption not on the entire image data generated by photography, but only on the portion corresponding to the pattern image, to generate partially-encrypted image data, and stored the generated partially-encrypted image data. The image data on which image processing has been performed and the generated partially-encrypted data may be incorporated into one file, and the generated file written to the memory card. Here, information indicating the location, in the image data, of the portion corresponding pattern image may also be incorporated in the file.

The encryption key may be divided into a partial key consisting of the upper bits thereof and a partial key consisting of the lower bits thereof, and the respective partial keys may be stored in two different apparatuses or recoding media that are held by two different parties or organizations. The encryption key can be reproduced only when both the partial key consisting of the upper bits and the partial key consisting of the lower bits, which are recorded in different apparatuses or recoding media, are brought together. Only when the encryption key is able to be reproduced in this way, can the encrypted image data be decrypted using the encryption key, and the image data obtained.

As one example, the partial keys obtained by dividing the encryption key may be held respectively by police and a courthouse, and in the case of a criminal investigation or the like, the two partial keys may be brought together with the consent of the two parties, and concatenated to generate the one encryption key. The generated encryption key can then be used to restore the original image data that was used when performing image referencing and mosaic processing etc., and thereby obtain photographic evidence.

(6) A particular user may be registered such that image referencing and mosaic processing etc. are not performed when that registered user operates the digital camera.

More specifically, the digital camera receives input of a registration password, and stores the received registration password internally. The digital camera requests input of an authentication password from a user, receives input of the authentication password, and judges whether the stored registration password and the received authentication password match. If the two passwords are judged to match, the digital camera does not perform image referencing and mosaic processing etc. If the two passwords are judged not to match, when performing photography the digital camera performs communication with the server apparatus to obtain a pattern image and control information, and performs image referencing and mosaic processing etc.

With such a structure, the digital camera can, for instance, photograph a person who is registered, with an operation by that registered person.

Here, the authentication of the person is not limited to being performed using a password. As an alternative example, the digital camera may store in advance characteristic information relating to a fingerprint or the iris of the person, and when photography is performed, perform authentication of the person by requesting input of the fingerprint or the iris, and comparing characteristic information of the input finger print or iris with the stored characteristic information.

Camera identification information identifying the digital camera may be registered in advance in the server apparatus, and the digital camera may make an inquiry to the server apparatus when performing photography as to whether the digital camera itself is registered. If the digital camera is a registered digital camera, it does not perform image referencing and mosaic processing etc. Alternatively, the structure may be such that if the digital camera is a registered digital camera, it does perform image referencing and mosaic processing etc.

(7) In the above preferred embodiment, each time the digital camera performs photography, it makes a request to the server for a pattern image and control information. However, the present invention is not limited to this structure.

For instance, the server apparatus may transmit all or part of the its stored pattern images, control information, attached information, user information tables and so on to the digital camera regularly, and the digital camera may receive and store these. When performing photography, the digital camera obtains a pattern image and control information from the information stored in the digital camera itself, instead of requesting the information from the server apparatus, and uses the obtained pattern image and control information to perform image referencing and mosaic processing etc.

With such a digital camera, given that information can be obtained from inside the digital camera, the amount of traffic between the digital camera and the server apparatus is reduced, and the load on the server apparatus is reduced.

(8) In the above preferred embodiment the digital camera performs image referencing and mosaic processing etc. before storing image data. However, the present invention is not limited to this structure.

The digital camera may temporarily record internally the image data generated by photography, and transmit the recorded image data to the server apparatus at fixed intervals. The server apparatus receives the image data, and records the received image data internally. Here, the server apparatus obtains a pattern image and control information from among those that it stores, and performs image referencing and mosaic processing etc. using the obtained pattern image and control information.

(9) The digital camera may be structured so as to perform image referencing and mosaic processing etc. only when used in a specific location, when photographing a specific subject, or when operated by a specific user.

(10) The digital camera may perform photography only to generate image data without performing image referencing and mosaic processing etc., and transmit the generated image data to the server apparatus. The server apparatus may perform image referencing and mosaic processing etc. with respect to the transmitted image data in the same way as the digital camera in the above preferred embodiment.

As one specific example, the digital camera may be a live camera that photographs a subject constantly or periodically, the transmits image data obtained by photography to the server apparatus.

The server apparatus may receive the image data, and perform image referencing and mosaic processing etc. with respect to the received image data. The server apparatus then, for instance, distributes the image data that has been subjected to mosaic processing etc. to other computers via a network such as the Internet.

(11) The digital camera may photograph a subject to generate image data, and transmit the generated image data to the server apparatus, which receives the image data and stores the received image data. The server apparatus may be used in this way for storing image data. The digital camera may receive, from the server apparatus, image data designated according to a user operation, and perform image referencing and mosaic processing etc. with respect to the received image data in the same way as the above preferred embodiment.

(12) In the above embodiment, attached data is attached to the image data, but the attached data may instead be embedded in the image data using a digital watermarking technique.

(13) When comparing image data generated by photography to a pattern image, the pattern image may be enlarged to an area ratio of 1.5, to generate an enlarged pattern image, and the image data generated by photography may be compared with the generated enlarged pattern image. Alternatively, the pattern image may be reduced to an area ratio of 0.75, to generate a reduced image, and the image data generated by photography may be compared with the image data.

Furthermore, a comparison of the image data and the pattern image, a comparison of the image data and the enlarged image, and a comparison of the image data and the reduced image may be performed simultaneously.

Furthermore, a different rate of enlargement and rate of reduction to those given above may be used.

(14) When comparing image data generated by photography with a pattern image, a portion of the pattern image may be extracted to generate a partial pattern image, and the image data generated by photography may be compared with the generated partial pattern image.

A combination of comparisons using an enlarged pattern image and a reduced pattern image may be used. In other words, a comparison of the image data and the pattern image, a comparison of the image data and the enlarged pattern image, a comparison of the image data and the reduced pattern image, and a comparison of the image data and the partial pattern image may be performed.

Furthermore, the partial pattern image may be enlarged to generate an enlarged partial pattern image, or reduced to generate a reduced partial pattern image, and a comparison made using the generated enlarged partial pattern image or the generated reduced partial image.

Furthermore, the pattern image may include information indicating the location of a partial pattern image to be extracted. Here, this information is extracted from the pattern image, the partial pattern image is specified based on the extracted information, and the specified partial pattern image is used in the comparison.

(15) When comparing image data generated by photography with a pattern image, pixels may be extracted from the image data one pixel at a time to generate extracted pixel data, and pixels may be extracted from the pattern image one at a time to generate an extracted pattern image. A comparison may then be made of the extracted image data and the extracted pattern image.

Furthermore, pixels may be extracted from the image data two pixels at a time to generate extracted image data, and pixels may be extracted from the pattern image two at a time to generate an extracted pattern image. Furthermore, the extracted pixels may be the pixels that are a certain number of pixels apart from each other.

If such a method is used, it can be said that if a portion corresponding to the pattern image exists in the image data generated by photography, the match is closer, the higher the density of extracted pixels. This enables a "degree of matching" to be determined.

This degree of matching may be made to correspond to the size used in the mosaic processing. For instance, the size used in the mosaic processing may be increased if the degree of matching is relatively high, and reduced if the degree of matching is relatively low.

This method may also be applied in the case of CG processing. For instance, first CG data that includes a relatively large number of rendition instructions and second CG data that includes a relatively small number of rendition instructions may be provided. CG processing may be performed using the first CG data when the degree of matching is high, and using the second CG data when the degree of matching is low.

Here, the CG data includes rendition instructions that render line segments, straight lines, circles, dots and the like. These rendition instructions do not include rendition instructions for overwriting the original image and filling in the entire target range of CG processing. This enables a similar effect as mosaic processing to be obtained.

(16) Image data generated by photography may be searched for portions that correspond to two or more pattern images. These two or more pattern images correspond respectively to two or more pieces of control information. When portions corresponding to two or more image patterns are found to exist, image processing is performed on each portion in accordance with the corresponding piece of control information.

(17) When performing image replacement, calculations may be performed on the replacement image and the partial image that, in image data generated by photography, matches a pattern image. The result of the calculations may be used to overwrite the partial image.

(18) The attached information may include an instruction that instructs mosaic processing, image replacement, frame deletion or the like, in correspondence with usage control information that specifies a copy count, a copy time limit or the like. Alternatively, the attached information may include detailed information pertaining to the various processing, in correspondence with usage control information.

Here, the copy count denotes the number of times certain compressed image data is copied to the information storage unit 204, and the copy time limit denotes a time limit until which an act of copying compressed image data from the information storage unit 204 to the memory card 300 is permitted.

When compressed image data stored in the information storage unit 204 is copied to the memory card 300, the digital camera 200 performs processing on the compressed image data in accordance with the usage information and the operation instruction, which indicates the corresponding processing, in the attached information attached to the compressed image data.

Each of FIGS. 21 to 25 shows an example of the attached information. Attached information 153 shown in FIG. 21 is an example of the same processing in correspondence with different copy counts, and FIG. 22 shows an example of different processing being in correspondence with different copy counts.

Attached information 155 shown in FIG. 23 is an example of the same processing in correspondence with different copy periods, and FIG. 24 shows an example of different processing in correspondence with different copy periods.

Attached information 157 shown in FIG. 25 is a mixture of the above described attached information, and is an example of different processing in correspondence with different copy counts and different copy periods.

Note that each of the attached information 153 to 157 is in a state of the range information having been overwritten to show an area that is to be subjected to processing. The area has been determined by performing matching based on a pattern image, and detecting a matching partial image.

Before the range information showing the area is overwritten, the attached information 153 to 157 has range information ((9999,9999)-(9999,9999)) such as shown in FIG. 9, and the attached information having the range information ((9999, 9999)-(9999, 9999)) is stored in the server apparatus 100. The digital camera 200 obtains the attached information having range information ((9999,9999)-(9999,9999)) from the server apparatus 100 as described in the above preferred embodiment.

(a) The attached information 153 shown in FIG. 21 includes a same processing instruction in correspondence with three different copy counts.

More specifically, the attached information 153 includes an operation instruction instructing mosaic processing. The attached information 153 has a copy counts range (1-4) in correspondence with detailed information that shows range information ((010,010)-(020,020)) and a size (1), a copy counts range (5-10) in correspondence with detailed information that shows range information ((010,010)-(020,020)) and a size (3), and a copy counts range (11-) in correspondence with detailed information that shows range information ((000,000)-(999,999)) and a size (5). Note that the range information ((000,000)-(999, 999)) shows the entire range of the image.

The digital camera 200 stores, in the information storage unit 204, an accumulated count that shows the number of times the compressed image data stored in the information storage unit 204 has been copied to the memory card 300 up to the present point in time.

When the digital camera 200 copies the compressed image data stored in the information storage unit 204 to the memory card 300, the control unit 208 reads the operation instruction and detailed information from the attached information 153 attached to the compressed image data, and judges which of the copy counts in the detailed information includes a comparison count obtained by adding "1" to the accumulated count stored in the information storage unit 204.

When it is judged that the comparison count is included in the copy counts range (1-4), the control unit 208 outputs an operation instruction instructing mosaic processing, together with the range information ((010,010)-(020,020)) and the size (1), to the image processing unit 203, and the image processing unit 203 operates in accordance with the received operation instruction, range information, and size.

When it is judged that the comparison count is included in the copy counts range (5-10), the control unit 208 outputs an operation instruction instructing mosaic processing, together with the range information ((010,010)-(020,020)) and the size (3), to the image processing unit 203, and the image processing unit 203 operates in accordance with the received operation instruction, range information, and size.

When it is judged that the comparison count is included in the copy counts range (11-), the control unit 208 outputs an operation instruction instructing mosaic processing, together with the range information ((000,000)-(999,999)) and the size (5), to the image processing unit 203, and the image processing unit 203 operates in accordance with the received operation instruction, range information, and size. Here, since the range information ((000,000)-(999,999)) shows the entire range of the image, the image processing unit 203 performs mosaic processing using the size (5) on the entire range of the image.

The control unit 208 overwrites the accumulated count stored in the information storage unit 204, such that the accumulated count newly shows the comparison count.

(b) The attached information 154 shown in FIG. 22 includes three different types of processing instructions respectively in correspondence with three different copy counts.

More specifically, the attached information 154 includes an operation instruction instructing mosaic processing, in correspondence with a copy counts range (1-4), and includes detailed information that shows range information ((010, 010)-(020,020)) and a size (3). The attached information 154 also includes an operation instruction instructing image replacement, in correspondence with a copy counts range (5-10), and includes detailed information that shows range information ((010,010)-(020,020)) and a CG data identifier. Furthermore, attached information 154 includes an operation instruction instructing frame deletion, in correspondence with a copy counts range (11-).

As described earlier, the digital camera 200 stores an accumulated count in the information storage unit 204.

When the digital camera 200 copies compressed image data stored in the information storage unit 204 to the memory card 300, the control unit 208 reads the operation instruction and the detailed information from the attached information 154 attached to the compressed image data, and judges which of the copy counts in the detailed information includes a comparison count obtained by adding "1" to the accumulated count stored in the information storage unit 204.

When it is judged that the comparison count is included in the copy counts range (1-4), the control unit 208 outputs an operation instruction instructing mosaic processing, together with the range information ((010,010)-(020,020)) and the size (3), to the image processing unit 203, and the image processing unit 203 operates in accordance with the received operation instruction, range information, and size.

When it is judged that the comparison count is included in the copy counts range (5-10), the control unit 208 outputs an operation instruction instructing image replacement, together with the range information ((010,010)-(020,020)) and the CG data identifier (CG009), to the image processing unit 203, and the image processing unit 203 operates in accordance with the received operation instruction, range information, and CG data identifier.

When it is judged that the comparison count is included in the copy counts range (11-), the control unit 208 outputs an operation instruction instructing frame deletion to the image processing unit 203, and the image processing unit 203 operates in accordance with the received operation instruction.

The control unit 208 overwrites the accumulated count stored in the information storage unit 204, such that the accumulated count newly shows the comparison count.

(c) The attached information 155 shown in FIG. 23 includes a same instruction in correspondence with three different copy periods.

More specifically, the attached information 155 includes an operation instruction instructing mosaic processing. The attached information 155 also includes: a copy period (2005.10.01-2005.10.31) in correspondence with detailed information that shows range information ((010,010)-(020, 020)) and a size (1); a copy period (2005.11.01-2005.11.30) in correspondence with detailed information that shows range information ((010,010)-(020,020)) and a size (3); and a copy period (2005.12.01-) in correspondence with detailed information that shows range information ((000,000)-(999,999)) and a size (5). Note that the range information ((000,000)-(999,999)) shows the entire range of the image.

When the digital camera 200 copies compressed image data storage unit 204 to the memory card 300, the control unit 208 obtains the present date and time, reads the operation instruction and detailed information from the attached information 155 attached to the compressed image data, and judges whether the obtained present date and time fall in any of the copy periods in the detailed information.

When it is judged that the present date and time fall in the copy period (2005.10.01-2005.10.31), the control unit 208 outputs an operation instruction instructing mosaic processing, together with the range information ((010,010)-(020, 020)) and the size (1), to the image processing unit 203, and the image processing unit 203 operates in accordance with the received operation instruction, range information, and size.

When it is judged that the present date and time fall in the copy period (2005.11.01-2005.11.30), the control unit 208 outputs an operation instruction instructing mosaic processing, together with the range information ((010,010)-(020, 020)) and the size (3), to the image processing unit 203, and the image processing unit 203 operates in accordance with the received operation instruction, range information, and size.

When it is judged that the present date and time fall in the copy period (2005.12.01-), the control unit 208 outputs an operation instruction instructing mosaic processing, together with the range information ((000,000)-(999,999)) and the size (5), to the image processing unit 203, and the image processing unit 203 operates in accordance with the received operation instruction, range information, and size. Here, since the range information ((000,000)-(999, 999)) shows the entire range of the image, the image processing unit 203 performs mosaic processing using the size (5) to the entire range of the image.

(d) The attached information 156 shown in FIG. 24 includes three different instructions in correspondence with three different copy periods.

More specifically, the attached information 156 includes an operation instruction instructing mosaic processing, in correspondence with a copy period (2005.10.01-2005.10.31), and detailed information that shows range information ((010, 010)-(020,020)) and a size (3). The attached information 156 also includes an operation instruction instructing image replacement, in correspondence with a copy period (2005.11.01-2005.11.30), and detailed information that shows range information ((010,010)-(020,020)) and a CG identifier (CG009). Furthermore, the attached information 156 includes and operation instruction instructing frame deletion, in correspondence with a copy period (2005.12.01-).

When the digital camera 200 copies compressed image data stored in the storage unit 204 to the memory card 300, the control unit 208 obtains the present date and time, reads the operation instruction and detailed information from the attached information 156 attached to the compressed image data, and judges whether the obtained present date and time fall in any of the copy periods in the detailed information.

When it is judged that the present date and time fall in the copy period (2005.10.01-2005.10.31), the control unit 208 outputs an operation instruction instructing mosaic processing, together with the range information ((010,010)-(020, 020)) and the size (3), to the image processing unit 203, and the image processing unit 203 operates in accordance with the received operation instruction, range information, and size.

When it is judged that the present date and time fall in the copy period (2005.11.01-2005.11.30), the control unit 208 outputs an operation instruction instructing replacement processing, together with the range information ((010,010)-(020, 020)) and the CG data identifier (CG009), to the image processing unit 203, and the image processing unit 203 operates in accordance with the received operation instruction, range information, and CG data identifier.

When it is judged that the present date and time fall in the copy period (2005.12.01-), the control unit 208 outputs an operation instruction instructing to the frame deletion, to the image processing unit 203, and the image processing unit 203 operates in accordance with the received operation instruction.

The control unit 208 overwrites the accumulated count stored in the information storage unit 204, such that the accumulated count newly shows the comparison count.

(e) The attached information 157 shown in FIG. 25 includes three different instructions in correspondence with three different copy counts/copy periods.

More specifically, the attached information 157 includes an operation instruction instructing mosaic processing in correspondence with a copy counts range (1-4), and detailed information that shows range information ((010,010)-(020, 020)) and a size (3). The attached information 157 also includes an operation instruction instructing image replacement in correspondence with a copy counts range (5-10), and detailed information that shows range information ((010, 010)-(020,020)) and a CG identifier (CG009). Furthermore, the attached information 157 includes and operation instruction instructing frame deletion, in correspondence with a copy period (2005.12.01-).

As described earlier, the digital camera 200 stores an accumulated count in the information storage unit 204.

When the digital camera 200 copies compressed image data stored in the information storage unit 204 to the memory card 300, the control unit 208 obtains the present date and time, reads the operation instruction and the detailed information from the attached information 157 attached to the compressed image data, and judges which of the copy counts in the detailed information includes a comparison count obtained by adding "1" to the accumulated count stored in the information storage unit 204. The control unit 208 also judges whether the obtained present date and time fall in the copy period in the detailed information.

When it is judged that the comparison count is included in the copy counts range (1-4), the control unit 208 outputs an operation instruction instructing mosaic processing, together with the range information ((010,010)-(020,020)) and the size (3), to the image processing unit 203, and the image processing unit 203 operates in accordance with the received operation instruction, range information, and size.

When it is judged that the comparison count is included in the copy counts range (5-10), the control unit 208 outputs an operation instruction instructing image replacement, together with the range information ((010,010)-(020,020)) and the CG data identifier (CG009), to the image processing unit 203, and the image processing unit 203 operates in accordance with the received operation instruction, range information, and CG data identifier.

If the present date and time are judged to fall in the copy period (2005.12.01-), the control unit 208 outputs an operation instruction instructing to the frame deletion, to the image processing unit 203, and the image processing unit 203 operates in accordance with the received operation instruction.

(f) According to the described processing, the server 100 stores attached information resulting from the range information in the attached information shown in FIG. 21 to FIG. 25 being replaced with range information ((9999, 9999)-(9999, 9999)). The digital camera 200 performs matching based on a pattern image, detects a partial image matching the pattern image, and after determining the area on which the various processing is to be performed, overwrites the range information that shows that area. As a result, the attached information shown in FIG. 21 to FIG. 25 is obtained.

However, the information overwritten in the attached information is not limited to the range information. For instance, the copy counts range or the copy period in the attached information shown in FIG. 21 to FIG. 25 may be overwritten in the digital camera 200.

For instance, instead of the copy periods (2005.10.01-2005.10.31), (2005.11.01-2005.11.30), and (2005.12.01-), the attached information shown in FIG. 23 may include copy periods (X1-X2), (X3-X4), and (X5-). Here, each of X1 to X5 is a character string showing that a time limit has not yet been determined.

When the digital camera 200 copies compressed image data stored in the information storage unit 204 to the memory card 300, the control unit 208 obtains the present date and time, and calculates time limits corresponding to X1 to X5 as follows.

X1=present date and time
X2=present date and time+30 days
X3=X2+1 day
X4=X3+30 days
X5=X4+1 day Next, the control unit 208 writes each of the calculated time limits to the positions of the corresponding copy periods.

(19) The image replacement instruction may be an instruction for changing the size, orientation, or the like of an object (in other words, a person, a building or the like) displayed in a portion of image data (or image data in a state directly before mosaic processing being performed, in other words, image data that has already had other processing performed thereon) obtained by the digital camera by photography. Furthermore, the image replacement instruction may be an instruction for adjusting the tone of the portion, for instance, changing the brightness or contrast of the portion, or changing the tone to monochrome.

(20) In the above preferred embodiment, the pieces of control information and attached information are computer programs, and the pieces of operation information are computer instructions in a machine language format. However, these are not limited to being in a so-called high-level language.

Each piece of control information and attached information may be a piece of sequence information composed of control information corresponding to the described mosaic processing, recording, image replacement, frame deletion or the like.

(21) The following is a specific example of how the above preferred embodiment can be put into practical use.

A digital camera can be installed so as to photograph the entrance (and the vicinity thereof) of a housing complex (apartment building), and repeatedly photograph the entrance automatically. This digital camera is for crime-prevention purposes. The image data generated by the digital camera is analyzed in the event of a crime such as a burglary taking place in the housing complex, thus providing as information for arrest of the perpetrator.

However, since images taken by this digital camera include images of residents of the housing complex, there is a problem that this kind of image data violates the privacy of the residents.

The image processing system 10 is able to solve this kind of problem, the following being a specific example of this image processing system 10.

A provider of a crime-prevention service provides crime-prevention services that use camera photography for crime prevention for a plurality of housing complexes.

The digital camera 200a is provided in a relatively high position inside the entrance area of a housing complex, so as to photograph in a direction of the door of the entrance area. The digital camera repeatedly photographs in the direction of the door automatically, at an interval of once every 5 seconds for instance. The image data obtained by photography is recorded in the digital camera 200a.

The digital camera 200b is installed in the same way as the digital camera 200a in a different housing complex, and operates in the same way as the digital camera 200a. Yet another digital camera is provided in yet another housing complex in the same way and operates in the same way.

The server apparatus 100 is installed in an office of the crime-prevention service provider.

The information storage unit 103 of the server apparatus 100 stores pattern images 131, 132, . . . that are photographs of the heads of all of the residents of the all of the housing complexes to which the crime-prevention service provider provides the crime-prevention service.

User identifiers in the user identifier table 121 stored in the information storage unit 103 in the server apparatus 100 identify the housing complexes. In other words, each "user" corresponds to a housing complex.

The control information 141 stored in the information storage unit 103 of the server apparatus 100 is, for instance, composed of a mosaic processing instruction and a recording instruction as shown in FIG. 4. The piece of detailed information corresponding to the mosaic processing instruction includes a condition "pattern image match", and a mosaic block size "5". Furthermore, a memory card is designated as the recording destination in the recording instruction.

When the control information 141 is executed, and it is judged that a portion of the image data obtained by photography by the digital camera 200a matches one of the pattern images (in other words, the photograph of the face of one of the residents), the mosaic processing instruction with the block size "5" is performed with respect to the portion of the image data (in other words, with respect to the potion that shows the face of the resident). The image data that has been subject to the mosaic processing is then written to the memory card.

By using the image processing system 10 in this way, when the face of a resident of the housing complex is shown in the image data obtained by the digital camera, mosaic processing is performed on the portion showing the face of the resident. This protects the privacy of the residents.

On the other hand, when a person who is not a resident is shown in the image data, the portion showing the person is left as is, without being subjected to mosaic processing. In this way, the image processing system 10 has functions of both protecting the privacy of residents and preventing crime.

Note that although mosaic processing is described as being performed on the portion showing a resident's face in this example, the processing performed is not limited to being mosaic processing. A portion showing a resident's face may be replaced with another image, or image data showing a resident's face may be deleted.

Furthermore, two or more cameras may be provided in one housing complex.

Furthermore, although the above example describes the crime-prevention service provider as providing the crime-prevention service with respect to a plurality of housing complexes, the present invention is not limited to such an arrangement. For instance, the digital cameras 200a and 200b and the server apparatus 100 may be provided in only a single housing complex, and the image processing system 10 may provide a crime prevention service such as that described only in the single housing complex.

(22) Each described apparatus is, specifically, a computer system composed of a microprocessor, a ROM, a RAM, and the like. A computer program is stored in the RAM. The computer program is composed of a plurality of instruction codes showing instructions with respect to a computer in order to have predetermined functions achieved. Each apparatus achieves predetermined functions by the microprocessor operating according to the computer programs. In other words, the microprocessor reads one of the instructions included in the computer program at a time, decodes the read instruction, and operates in accordance with the result of the decoding.

(23) All or part of the compositional elements of each apparatus may be composed of one system LSI (Large Scale Integrated circuit). The system LSI is a super-multifunctional LSI on which a plurality of compositional units are manufactured integrated on one chip, and is specifically a computer system that includes a microprocessor, a ROM, a RAM, or the like. A computer program is stored in the RAM. The system LSI achieves its functions by the microprocessor operating according to the computer program.

Furthermore, the units that are the compositional elements of each of the apparatuses may be realized separately with individual chips, or part or all may be included on one chip. Here, the LSI may be an IC, a system LSI, a super LSI, or ultra LSI, depending on the degree of integration.

Furthermore, the integration of circuits is not limited to being realized with LSI, but may be realized with a special-purpose circuit or a general-use processor. Alternatively, the integration may be realized with use of a FPGA (field programmable gate array) that is programmable after manufacturing of the LSI, or a re-configurable processor that enables re-configuration of the connection and settings of circuit cells in the LSI.

(24) Part or all of the compositional elements of each apparatus may be composed of a removable IC card or a single module. The IC card or the module is a computer system composed of a microprocessor, a ROM, a RAM, or the like. The IC card or the module may be included the aforementioned super-multifunctional LSI. The IC card or the module achieves its functions by the microprocessor operating according to computer program. The IC card or the module may be tamper-resistant.

(25) The present invention may be methods shown by the above. Furthermore, the methods may be a computer program realized by a computer, and may be a digital signal of the computer program.

Furthermore, the present invention may be a computer-readable recording medium such as a flexible disk, a hard disk, a CD-ROM, an MO, a DVD, a DVD-ROM, a DVD-RAM, a BD (Blu-ray Disc) or a semiconductor memory, that stores the computer program or the digital signal. Furthermore, the present invention may be the computer program or the digital signal recorded on any of the aforementioned recording media.

Furthermore, the present invention may be the computer program or the digital signal transmitted on a electric communication network, a wireless or wired communication network, a network of which the Internet is representative, or a data broadcast.

Furthermore, the present invention may be a computer system that includes a microprocessor and a memory, the memory storing the computer program, and the microprocessor operating according to the computer program.

Furthermore, by transferring the program or the digital signal to the recording medium, or by transferring the program or the digital signal via a network or the like, the program or the digital signal may be executed by another independent computer system.

(26) The present invention may be any combination of the above-described embodiment and modifications.

Industrial Applicability

The apparatuses of the image processing system of the present invention can be used advantageously for business purposes, and repeatedly and continuously in an industry that uses image data obtained by photography. Furthermore, the apparatuses can be used advantageously for business purposes, and repeatedly and continuously by being manufactured and sold in an electronic device manufacturing industry.

The invention claimed is:

1. An image processing apparatus that performs image processing on a photographic image according to a result of a comparison of the photographic image with a reference image, the image processing apparatus comprising:

a first image storage unit operable to store the photographic image generated by photography;

an instruction storage unit operable to store a processing instruction that instructs image processing;

a second image storage unit operable to store the reference image, which has been generated in advance;

a judgment unit operable to judge whether or not a portion corresponding to the reference image exists in the photographic image;

an execution unit operable to, according to a result of the judgment performed by the judgment unit, perform the image processing on the photographic image in accordance with the processing instruction;

a location obtaining unit operable to obtain a present location at which the image processing apparatus is located; and a range judgment unit operable to judge whether or not the obtained present location is outside a predetermined range, wherein, when the range judgment unit judges that the present location is outside the predetermined range, the judgment unit performs the judgment of whether or not the portion corresponding to the reference image exists in the photographic image.

* * * * *